United States Patent
Tan et al.

(10) Patent No.: US 12,531,719 B2
(45) Date of Patent: Jan. 20, 2026

(54) ENCODING DATA FOR HOMOMORPHIC COMPUTATION AND PERFORMING HOMOMORPHIC COMPUTATION ON ENCODED DATA

(71) Applicant: Agency for Science, Technology and Research, Singapore (SG)

(72) Inventors: Hong Meng Benjamin Tan, Singapore (SG); Sze Ling Yeo, Singapore (SG); Khin Mi Mi Aung, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 338 days.

(21) Appl. No.: 18/550,100

(22) PCT Filed: Mar. 12, 2021

(86) PCT No.: PCT/SG2021/050131
§ 371 (c)(1),
(2) Date: Sep. 11, 2023

(87) PCT Pub. No.: WO2022/191770
PCT Pub. Date: Sep. 15, 2022

(65) Prior Publication Data
US 2024/0171374 A1 May 23, 2024

(51) Int. Cl.
*H04K 1/00* (2006.01)
*H04L 9/00* (2022.01)
(Continued)

(52) U.S. Cl.
CPC ............... *H04L 9/008* (2013.01); *H04L 9/06* (2013.01)

(58) Field of Classification Search
CPC ................... H04L 9/008; H04L 9/06
(Continued)

(56) References Cited

U.S. PATENT DOCUMENTS 9,787,614 B2 10/2017 Heide et al.
2003/0007635 A1* 1/2003 Li ........................... H04L 9/001
380/28

(Continued)

FOREIGN PATENT DOCUMENTS

CN 108924552 A 11/2018

OTHER PUBLICATIONS

Cascudo et al., "A Secret-Sharing Based MPC Protocol for Boolean Circuits with Good Amortized Complexity", Cryptology ePrint Archive, Paper 2020/162, Feb. 2020, 33 pages.
(Continued)

*Primary Examiner* — Jeffrey C Pwu
*Assistant Examiner* — Samuel Ambaye

(57) ABSTRACT

In some aspects, a method for generating encoded plaintext data in a plaintext vector space includes obtaining a plurality of vectors of plaintext elements, where each plaintext element is an element of a first finite field. The method further includes encoding the plurality of vectors of plaintext elements to a vector of field elements, where each vector of plaintext elements is encoded to a respective field element of the vector of field elements, each of the field elements is an element of a second finite field, and the second finite field is a finite extension field of the first finite field. The method additionally includes encoding the vector of field elements into an element of the plaintext vector space to produce the encoded plaintext data for homomorphic encryption and computation.

20 Claims, 10 Drawing Sheets

(51) Int. Cl.
*H04L 9/06* (2006.01)
*H04L 9/28* (2006.01)

(58) Field of Classification Search
USPC .......................................................... 380/28
See application file for complete search history.

(56) References Cited

U.S. PATENT DOCUMENTS

2016/0164671 A1* 6/2016 Gentry ................ H04L 63/0442
380/28
2019/0334694 A1* 10/2019 Chen ..................... H04L 9/0631
2019/0386814 A1* 12/2019 Ahmed .................. H04L 9/008

OTHER PUBLICATIONS

Block et al., "Secure Computation with Constant Communication Overhead using Multiplication Embeddings", Progress in Cryptology—INDOCRYPT 2018 Lecture Notes in Computer Science, vol. 11356, Dec. 2018, 27 pages.
Han et al., "Improved Homomorphic Discrete Fourier Transforms and FHE Bootstrapping," IEEE Access, vol. 7, Apr. 2019, pp. 57361-57370.
Jaschke et al., "(Finite) Field Work: Choosing the Best Encoding of Numbers for FHE Computation," Cryptology and Network Security: 16th International Conference (CANS 2017), Nov. 2017, 45 pages.
Kim et al., "On the Efficiency of FHE-Based Private Queries," IEEE Transactions on Dependable and Secure Computing, vol. 15, No. 2, Mar./Apr. 2018, pp. 357-363.
Tan et al., "Efficient Private Comparison Queries over Encrypted Databases using Fully Homomorphic Encryption with Finite Fields," IEEE Transactions on Dependable and Secure Computing, vol. 18, No. 6, Nov./Dec. 2020, pp. 2861-2874.
Cascudo et al., "Amortized Complexity of Information-Theoretically Secure MPC Revisited," Advances in Cryptology—CRYPTO 2018, Lecture Notes in Computer Science, vol. 10993, Jul. 2018, pp. 395-426.
Castryck et al., "Homomorphic SIM2D Operations: Single Instruction Much More Data," Advances in Cryptology—EUROCRYPT 2018, Lecture Notes in Computer Science vol. 10820, Mar. 2018, pp. 338-359.
Costache et al., "Faster homomorphic evaluation of discrete fourier transforms," International Conference on Financial Cryptography and Data Security, Lecture Notes in Computer Science vol. 10322, Apr. 2017, pp. 517-529.
Block et al., "Secure Computation with Constant Communication Overhead Using Multiplication Embeddings," INDOCRYPT 2018: Progress in Cryptology, Lecture Notes in Computer Science vol. 11356, Dec. 2018, pp. 375-398.
Chudnovsky et al., "Algebraic complexities and algebraic curves over finite fields," Journal of Complexity, vol. 4, Dec. 1988, pp. 285-316.
Cascudo et al., "The Arithmetic Codex", 2012 IEEE Information Theory Workshop, Sep. 2012, pp. 75-79.
Smart, et al., "Fully Homomorphic SIMD Operations", Designs, Codes and Cryptography, vol. 71, Apr. 2014, pp. 57-81.
Brakerski et al., "(Leveled) Fully Homomorphic Encryption without Bootstrapping", ITCS '12: Proceedings of the 3rd Innovations in Theoretical Computer Science Conference, Jan. 2012, pp. 309-325.
Brakerski, "Fully Homomorphic Encryption without Modulus Switching from Classical GapSVP," CRYPTO 2012: Advances in Cryptology, Lecture Notes in Computer Science vol. 7417, Aug. 2012, 20 pages.
Fan et al., "Somewhat Practical Fully Homomorphic Encryption", Cryptology ePrint Archive, Paper 2012/144, Mar. 2012, 19 pages.
Halevi et al., "Algorithms in HElib," CRYPTO 2014: Advances in Cryptology, Lecture Notes in Computer Science, vol. 8616, Aug. 2014, pp. 554-571.
Halevi et al., "Bootstrapping for HElib", EUROCRYPT 2015: Advances in Cryptology, Lecture Notes in Computer Science vol. 9056, Apr. 2015, pp. 641-670.
Cramer et al., "Secure Multiparty Computation and Secret Sharing", Cambridge University Press, Jul. 2015, 10 pages.
Halevi et al., "Faster Homomorphic Linear Transformations in HElib", CRYPTO 2018: Advances in Cryptology, Lecture Notes in Computer Science vol. 10991, Jul. 2018, pp. 93-120.
Kim et al., "Search Condition-Hiding Query Evaluation on Encrypted Databases," IEEE Access, vol. 7, Nov. 2019, pp. 161283-161295.
Roman, "10.4 Linearized Polynomials", in: Field Theory; Second Edition, Springer, Nov. 2005, pp. 236-237.
Cascudo et al., "Asymptotically Good Ideal Linear Secret Sharing with Strong Multiplication over Any Fixed Finite Field", CRYPTO 2009: Advances in Cryptology, Lecture Notes in Computer Science vol. 5677, Aug. 2009, pp. 466-486.
Kim et al., "Private Compound Wildcard Queries Using Fully Homomorphic Encryption," IEEE Transactions on Dependable And Secure Computing, vol. 16, No. 5, Sep./Oct. 2019, pp. 743-756.
Gentry et al., "Fully Homomorphic Encryption with Polylog Overhead," EUROCRYPT 2012: Advances in Cryptology, Lecture Notes in Computer Science vol. 7237, Apr. 2012, pp. 465-482.
Block et al., "Secure Computation Based on Leaky Correlations: High Resilience Setting," CRYPTO 2017: Advances in Cryptology, Lecture Notes in Computer Science vol. 10402, Aug. 2017, pp. 3-32.
Castryck W. et al., "Homomorphic SIM2D operations: Single Instruction Much More Data", Annual International Conference on the Theory and Applications of Cryptographic Techniques, Mar. 2018, 22 pages.
International Search Report and Written Opinion issued Jun. 15, 2021 regarding International Application No. PCT/SG2021/050131, 8 pages.

* cited by examiner

First Ciphertext

410

Second Ciphertext

412

First Ciphertext ⊕ Second Ciphertext

First Ciphertext ⊗ Second Ciphertext

ENCODING DATA FOR HOMOMORPHIC COMPUTATION AND PERFORMING HOMOMORPHIC COMPUTATION ON ENCODED DATA

CROSS-REFERENCE TO RELATED APPLICATION

This application is a 371 National Stage of International Application No. PCT/SG2021/050131, filed on 12 Mar. 2021, the content of which being hereby incorporated by reference in its entirety for all purposes.

TECHNICAL FIELD

The present disclosure generally relates to encoding data for homomorphic computation and performing homomorphic computation on the encoded data.

BACKGROUND

With the development of the Internet and the birth of the cloud computing concept, homomorphic encryption has become increasingly important as the need for ciphertext search, ciphertext transmission, and multi-party computation keeps growing. Homomorphic encryption is an encryption method with special attributes. In general, homomorphic encryption is a mapping from a plaintext space to a ciphertext space that preserves arithmetic operations. Compared with other methods of encryption, homomorphic encryption can implement multiple computation functions between ciphertexts in addition to basic encryption operations. Homomorphic encryption allows entities to perform a specific algebraic operation on a ciphertext to obtain a result that is still encrypted. A result obtained by decrypting the ciphertext is the same as a result obtained by performing a same operation on a plaintext. In other words, when homomorphic encryption is used, performing computation before decryption can be equivalent to performing computation after decryption. Despite its special attributes, homomorphic encryption can be computationally expensive (e.g., suffers from high memory requirements and processing overhead) compared to computations performed on plaintext data.

The single instruction, multiple data (SIMD) technique has been used in some conventional homomorphic encryption schemes to reduce the computational expense of performing operations on homomorphically encrypted data. The SIMD technique allows a vector of plaintexts to be encrypted in a single ciphertext, with ciphertext operations corresponding to component-wise operations on its plaintext vector. Other vector manipulation operations can also be performed, including shifts and rotations of the entries in the vector, which can be leveraged to perform arbitrary permutations on the encrypted vector. With SIMD, for index m and prime plaintext modulus p, also denoted by t in some of the literature, the plaintext data lies in the plaintext vector space $(\mathbb{F}_{p^d})^k$ where $k \cdot d = \phi(m)$ and $\phi(\cdot)$ is the Euler totient function. Most work applying SIMD for homomorphic computation focus on the subspace $(\mathbb{F}_p)^k$ where base field elements are placed in each slot. Furthermore, for homomorphic encryption parameters that are supported by current homomorphic encryption standardization efforts, choosing a prime under 100 for p leads to extension fields of extremely high degree, in the range of hundreds to thousands. Such primes can be useful for circuit-based homomorphic encryption computation.

Some have attempted to use the complete space $(\mathbb{F}_{p^d})^k$ for SIMD homomorphic computation, but these approaches suffer from limitations such as increased memory requirements. Some others have attempted generalize SIMD to composite moduli instead of prime moduli to increase the amount of data that can be packed in a single ciphertext. For example, some proposals interpret real numbers in some base-b encoding and treat the resulting strings as Laurent polynomials. As another example, some proposals encode real numbers in their base-b representation over a cyclotomic plaintext ring $$\frac{Z_p[x]}{x^{2^n}+1}.$$

However, these techniques suffer from some crucial limitations. For example, Laurent polynomial encoding does not enable fast circuit-based operations for comparisons such as equality and order comparisons. Additionally, Laurent polynomial encoding is only suitable for fixed point arithmetic and not for general arithmetic circuits. Furthermore, using composite moduli increases the noise of each operation due to a larger plaintext modulus, and it is not possible for messages encoded under different prime factors to interact during homomorphic computation.

Therefore, there exists a need for encoding schemes that are compatible with SIMD and that can: exploit the complete plaintext vector space $(\mathbb{F}_{p^d})^k$; offer finite extension field operations over the finite extension field $\mathbb{F}_{p^d}$; be used with extension fields of extremely high degree; offer efficient memory usage; and enable fast general arithmetic circuit-based homomorphic encryption computation.

SUMMARY

According to a first aspect of the present disclosure, a method for generating encoded plaintext data in a plaintext vector space is provided. The method includes obtaining a plurality of vectors of plaintext elements, where each plaintext element is an element of a first finite field. The method further includes encoding the plurality of vectors of plaintext elements to a vector of field elements, where each vector of plaintext elements is encoded to a respective field element of the vector of field elements, each of the field elements is an element of a second finite field, and the second finite field is a finite extension field of the first finite field. The method additionally includes encoding the vector of field elements into an element of the plaintext vector space to produce the encoded plaintext data for homomorphic encryption and computation.

According to a second aspect of the present disclosure, a system for generating encoded plaintext data in a plaintext vector space is provided. The system includes a memory, and at least one processor communicatively coupled to the memory and configured to perform operations. The operations include obtaining a plurality of vectors of plaintext elements, where each plaintext element is an element of a first finite field. The operations further include encoding the plurality of vectors of plaintext elements to a vector of field elements, where each vector of plaintext elements is encoded to a respective field element of the vector of field elements, each of the field elements is an element of a second finite field, and the second finite field is a finite extension field of the first finite field. The operations additionally include encoding the vector of field elements into an element of the plaintext vector space to produce the encoded plaintext data for homomorphic encryption and computation.

According to a third aspect of the present disclosure a non-transitory computer-readable medium for generating encoded plaintext data in a plaintext vector space is provided. The non-transitory computer-readable medium includes instructions that are operable, when executed by data processing apparatus, to perform operations. The operations include obtaining a plurality of vectors of plaintext elements, where each plaintext element is an element of a first finite field. The operations further include encoding the plurality of vectors of plaintext elements to a vector of field elements, where each vector of plaintext elements is encoded to a respective field element of the vector of field elements, each of the field elements is an element of a second finite field, and the second finite field is a finite extension field of the first finite field. The operations additionally include encoding the vector of field elements into an element of the plaintext vector space to produce the encoded plaintext data for homomorphic encryption and computation.

DETAILED DESCRIPTION

In some aspects of what is described here, data is encoded for homomorphic computation and homomorphic computation is performed on the encoded data.

In some instances, aspects of the systems and techniques described here provide technical improvements and advantages over existing approaches. For example, aspects of the systems and techniques described here exploit a complete plaintext vector space $(\mathbb{F}_{p^d})^k$, offer finite extension field operations over the finite extension field $\mathbb{F}_{p^d}$, can be used with extension fields of extremely high degree (e.g., for a prime p under 100), offer efficient memory usage, and enable fast general arithmetic circuit-based homomorphic encryption computation.

Figure 1:
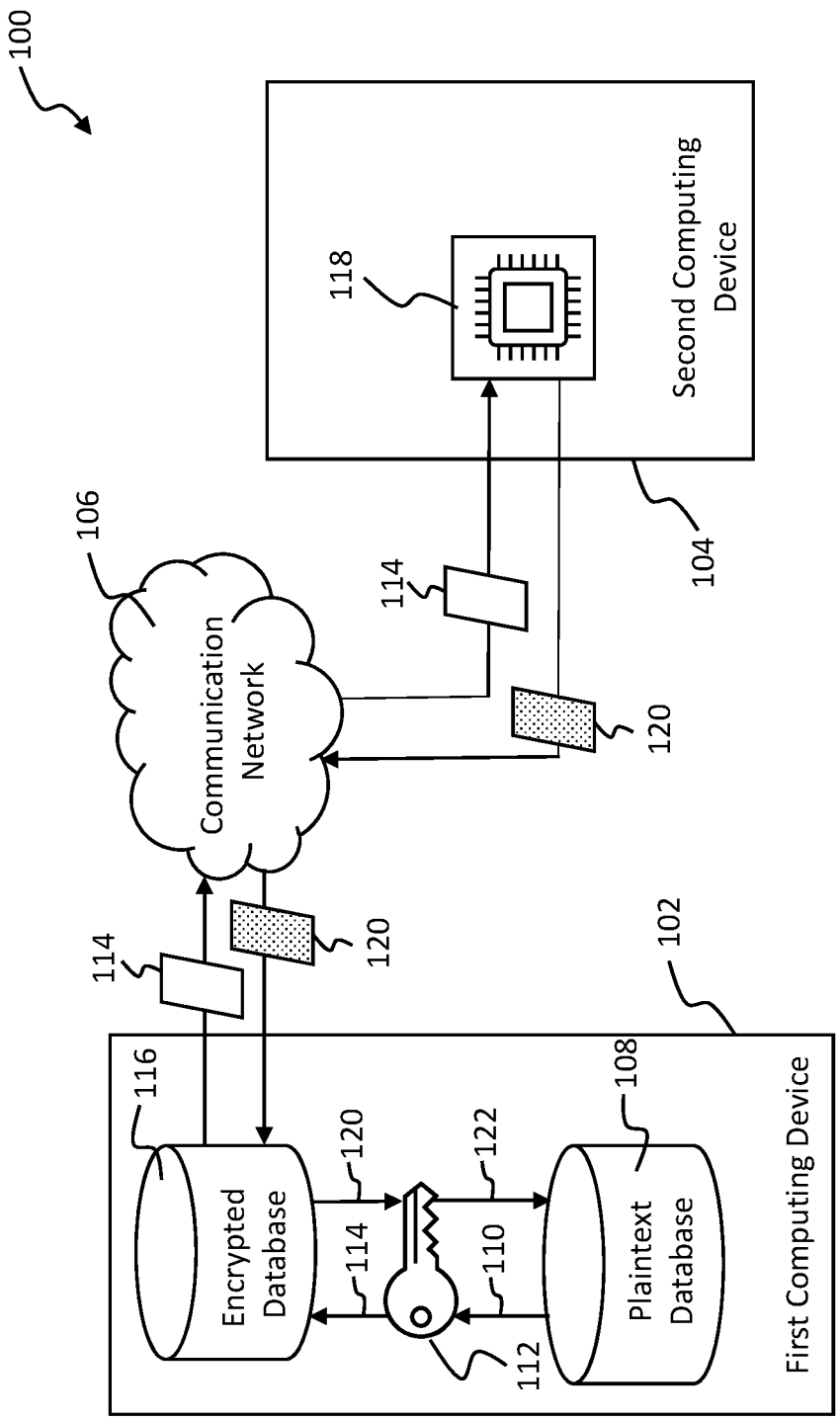
FIG. 1 is a diagram showing an example computing environment, according to an implementation of the present disclosure.

FIG. 1 is a diagram showing an example computing environment 100, according to an implementation of the present disclosure. The example computing environment 100 includes a first computing device 102, a second computing device 104, and a communication network 106 that communicatively couples the first and second computing devices 102, 104. The computing environment 100 can be used to implement a confidential computing environment. For example, the first computing device 102 can homomorphically encrypt plaintext data (e.g., a vector of plaintexts) to generate homomorphically encrypted data (e.g., a single ciphertext or multiple ciphertexts). The encrypted data can be sent from the first computing device 102 to the second computing device 104 for processing, without the second computing device 104 having to decrypt the encrypted data from the first computing device 102. Since the encrypted data from the first computing device 102 is not decrypted by the second computing device 104 before, during, or after processing of the encrypted data, the second computing device 104 does not have knowledge of (or access to) the plaintext data of the first computing device 102. Consequently, the computing environment 100 enables computations to be outsourced and executed on encrypted data in a confidential manner, while maintaining security and anonymity of the plaintext data from the first computing device 102.

The first computing device 102 may be a trusted client (or user) device, examples of which include a laptop computer, a smartphone, a personal digital assistant, a tablet computer, a standard personal computer, a mobile device, a smartphone, a smart watch, a smart thermostat, a wireless-enabled camera, or any other type of data processing device. In some implementations, the first computing device 102 includes a plaintext database 108 that includes plaintext data 110. The plaintext data 110 can, in some examples, be a vector of plaintexts. The first computing device 102 is configured to encrypt the plaintext data 110 with a secret key 112 using one or more homomorphic encryption schemes. In some implementations, the homomorphic encryption schemes can be performed by one or more circuits included in the first computing device 102. Example circuits that may perform homomorphic encryption of the plaintext data 110 include one or more Boolean circuits with logic gates (e.g., AND, OR, NAND, or NOT gates, other logic gates or a combination thereof), one or more arithmetic circuits (e.g., with addition, multiplication, or negation functions, other arithmetic functions or a combination thereof), or a combination of Boolean and arithmetic circuits, although other types of circuits may be used to perform the homomorphic encryption. Homomorphic encryption of the plaintext data 110 generates encrypted data 114 (e.g., homomorphically-encrypted data) that may be stored in an encrypted database 116 of the first computing device 102. The encrypted data 114 can, in some examples, be a single ciphertext. The encrypted data 114 may subsequently be sent from the first computing device 102 to the second computing device 104, via the communication network 106, for processing.

The communication network 106 can be the Internet, an intranet, or another wired or wireless communication network. In some implementations, the communication network 106 may be configured to operate according to a wireless network standard or another type of wireless communication protocol. For example, the communication network 106 may be configured to operate as Local Area Network (LAN), a Wide Area Network (WAN), a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others. In some implementations, the communication network 106 may be configured to operate according to a cellular network standard. Examples of cellular networks standards include: networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others.

The second computing device 104 may be an untrusted device, for example, a remote server, a cloud-based computer system, or any other type of data processing device that is remote from the first computing device 102. In some examples, the first computing device 102 is operated by a first entity, and the second computing device 104 is operated by a second, different entity (e.g., a third-party cloud service provider). In some implementations, the second computing device 104 includes a data processing apparatus 118 that is configured to execute homomorphic computation processing on the encrypted data 114. The data processing apparatus 118 can include one or more Boolean circuits, one or more arithmetic circuits, or a combination of Boolean and arithmetic circuits, although other types of circuits may be used to implement the data processing apparatus 118.

The result of the homomorphic computation (indicated in FIG. 1 as an encrypted result 120) may subsequently be sent from the second computing device 104 to the first computing device 102 via the communication network 106. The first computing device 102 receives the encrypted result 120 and may store the encrypted result 120 in the encrypted database 116. The first computing device 102 is configured to decrypt the encrypted result 120 with the secret key 112 using one or more homomorphic decryption schemes. In some implementations, the homomorphic decryption schemes can be performed by one or more Boolean circuits, one or more arithmetic circuits, or a combination of Boolean and arithmetic circuits, although other types of circuits may be used to perform the homomorphic decryption. Homomorphic decryption of the encrypted result 120 generates a plaintext result 122 that may be stored in the plaintext database 108 of the first computing device 102.

The computing environment 100 can implement a confidential computing environment for data delegation or privacy-preserving data processing. For example, a data owner (e.g., a user of the first computing device 102) can homomorphically encrypt their plaintext data, and send the homomorphically-encrypted data to a cloud-based server (e.g., the second computing device 104) for processing. The cloud-based server performs homomorphic computation processing on the homomorphically-encrypted data without having to decrypt it and without having to access the secret key or the plaintext data of the data owner, thereby maintaining security and anonymity of plaintext data of the data owner.

One example scenario where the computing environment 100 can be applied is in a medical context. As an illustration, a doctor may obtain medical data associated with a patient. Examples of medical data include electrocardiogram (EKG) information, an x-ray image, a magnetic resonance imaging (MRI) image, a computed tomography (CT) scan, or any other type of medical data. The doctor may analyze the medical data and make a diagnosis as to whether there is any abnormality in the medical data. The abnormality may indicate that there are one or more conditions associated with the patient. In some cases, the diagnosis may be improved by running advanced detection schemes on the medical data, examples being convolutional neural networks machine learning or artificial intelligence systems trained on various medical images for the purpose of diagnosing problems with presented medical data. In such cases, the doctor may outsource the analysis of the medical data to a third-party that executes the advanced detection schemes. However, the medical data may include personal data associated with the patient and may be protected by laws such as HIPAA (Health Insurance Portability and Accountability Act). The doctor can utilize the computing environment 100 to possibly improve the diagnosis, while keeping private the personal data associated with the patient. For example, the doctor may use the first computing device 102 to homomorphically encrypt the medical data and send the homomorphically encrypted medical data to the second computing device 104 for further analysis. Since the second computing device 104 does not decrypt the homomorphically encrypted medical data before, during, or after the analysis, the second computing device 104 does not have access to the personal data associated with the patient.

Another example scenario where the computing environment 100 can be applied is in the credit market. For example, a retail location may have a customer who wishes to open a credit account, and the customer may be asked to complete a credit application that includes credit information and personal data associated with the customer such as a name, an address, or unique identifying information that represents the customer such as a social security number or a national identification number. Although the retail location may be able to analyze the credit application to determine whether to open a customer credit account, it may be possible to perform a more thorough analysis by obtaining access to additional information and decision-making algorithms. The retail location can outsource such analysis to a third-party that executes advanced analysis schemes. The retail location can utilize the computing environment 100 to determine whether to open a customer credit account, while keeping private the personal data associated with the customer. For example, the retail location may use the first computing device 102 to homomorphically encrypt the credit application and send the homomorphically encrypted credit application to the second computing device 104 for further analysis. Since the second computing device 104 does not decrypt the homomorphically encrypted credit application before, during, or after the analysis, the second computing device 104 does not have access to the personal data associated with the customer.

The example scenarios discussed above are merely illustrative and not meant to be limiting, and the computing environment 100 can be applied to other scenarios that involve data delegation or privacy-preserving data processing.

Figure 2:
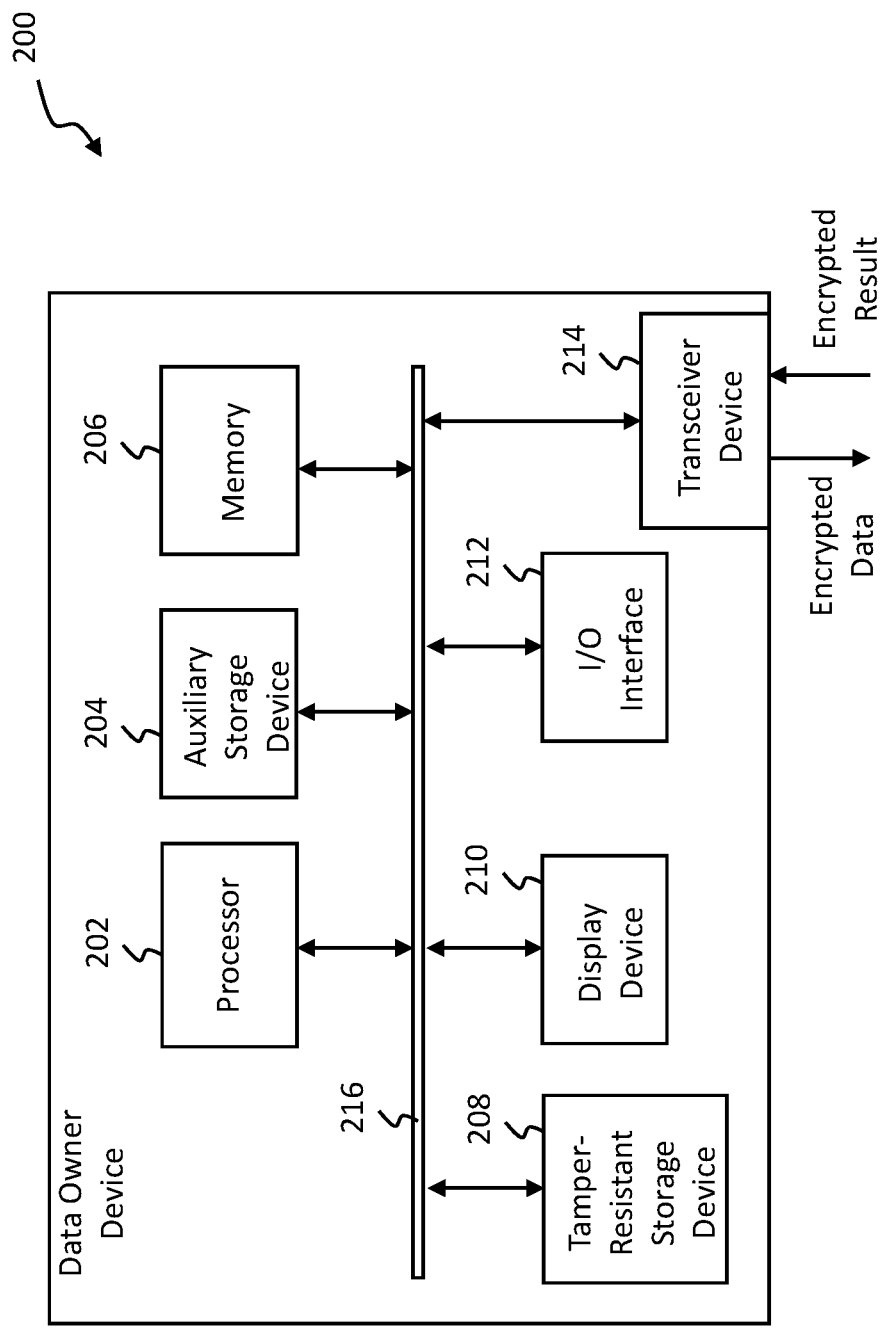
FIG. 2 is a diagram showing an example data owner device, according to an implementation of the present disclosure.

FIG. 2 is a diagram showing an example data owner device 200, according to an implementation of the present disclosure. The data owner device 200 may be an example implementation of the first computing device 102 shown in FIG. 1. In some implementations, the data owner device 200 includes a processor 202 (e.g., a central processing unit), an auxiliary storage device 204 formed by a non-volatile storage device such as Read Only Memory (ROM), and a memory 206 formed by a volatile storage device such as Random Access Memory (RAM). In some implementations, instructions (e.g., for executing homomorphic encryption) are stored in the auxiliary storage device 204. For example, the instructions may include instructions to perform one or more of the operations in the example processes shown in FIGS. 7 to 10. The instructions can include programs, codes, scripts, modules, or other types of data stored in the auxiliary storage device 204. Additionally or alternatively, the instructions can be encoded as pre-programmed or re-programmable logic circuits, logic gates, or other types of hardware or firmware components or modules. The auxiliary storage device 204 may also store plaintext data (e.g., plaintext data 110 in the example of FIG. 1) for encryption. The data owner device 200 also includes a tamper-resistant storage device 208, which may be configured to store a secret key used for encryption and decryption (e.g., the secret key 112 in the example of FIG. 1).

The processor 202 may be or include a general-purpose microprocessor, as a specialized co-processor or another type of data processing apparatus. In some examples, the processor 202 may be formed using one or more Boolean circuits, one or more arithmetic circuits, or a combination of Boolean and arithmetic circuits, although other types of circuits may be used to implement the processor 202. In some cases, the processor 202 performs high level operation of the data owner device 200. For example, the processor 202 may be configured to execute or interpret software, scripts, programs, functions, executables, or other instructions stored in the auxiliary storage device 204. In some instances, the processor 202 may execute the instructions by, for example, reading the instructions onto the memory 206 to perform operations and overall control of the data owner device 200.

The data owner device 200 shown in the example of FIG. 2 further includes a display device 210 (such as a display configured to display processed data), one or more Input/Output (I/O) interfaces 212 to a peripheral device (e.g., a keyboard, a mouse, or any other peripheral device), and a transceiver device 214 (e.g., a modem or any device having a transmitter circuit and a receiver circuit). The transceiver device 214 may be configured to communicate signals formatted according to a wired or wireless communication standard or a cellular network standard such that the data owner device 200 can access the communication network 106 to transmit and receive data. The various components of the data owner device 200 are communicatively coupled to one another via an interconnected bus 216. The various components of the data owner device 200 may be housed together in a common housing or other assembly. In some implementations, one or more of the components of data owner device 200 can be housed separately, for example, in a separate housing or other assembly.

During an example operation of the data owner device 200, the processor 202 accesses the auxiliary storage device 204 and reads the plaintext data and the instructions for executing homomorphic encryption onto the memory 206. The processor 202 may also access the secret key stored in the tamper-resistant storage device 208. The processor 202 may subsequently execute the instructions to homomorphically encrypt the plaintext data (e.g., plaintext data 110 in FIG. 1) using the secret key (e.g., the secret key 112 in FIG. 1), thus generating encrypted data (e.g., the encrypted data 114 in FIG. 1). The encrypted data may be stored in the auxiliary storage device 204 or the memory 206. The transceiver device 214 may transmit the homomorphically encrypted data to a data operator device (e.g., the second computing device 104 in FIG. 1) via the communication network 106.

Figure 3:
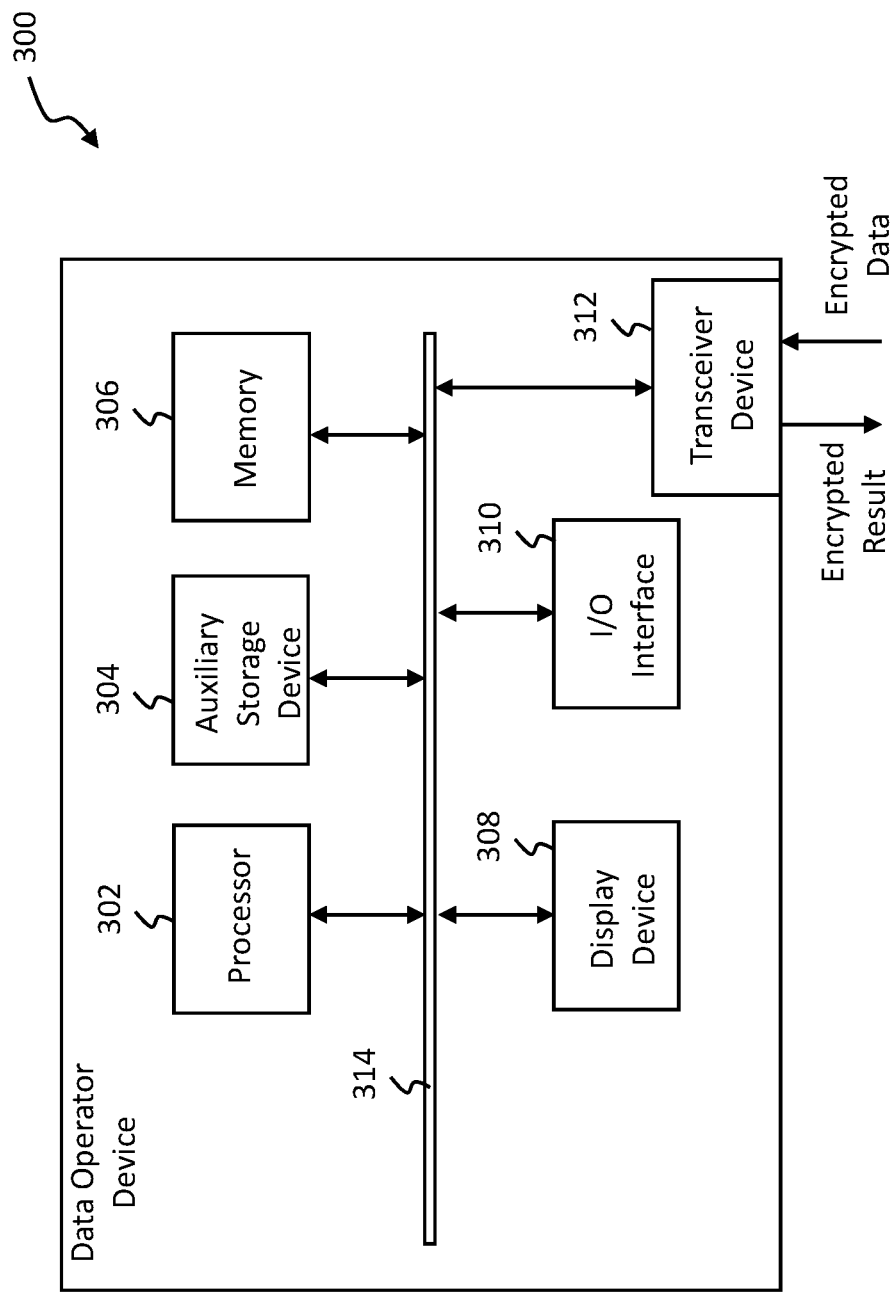
FIG. 3 is a diagram showing an example data operator device, according to an implementation of the present disclosure.

FIG. 3 is a diagram showing an example data operator device 300, according to an implementation of the present disclosure. The data operator device 300 may be an example implementation of the second computing device 104 shown in FIG. 1. In some implementations, the data operator device 300 includes a processor 302 (e.g., a central processing unit), an auxiliary storage device 304 formed by a non-volatile storage device such as ROM, and a memory 306 formed by a volatile storage device such as RAM. In some implementations, instructions (e.g., for executing homomorphic computation processing) are stored in the auxiliary storage device 304. For example, the instructions may include instructions to perform one or more of the operations in the example processes shown in FIGS. 7 to 10. The instructions can include programs, codes, scripts, modules, or other types of data stored in the auxiliary storage device 304. Additionally or alternatively, the instructions can be encoded as pre-programmed or re-programmable logic circuits, logic gates, or other types of hardware or firmware components or modules.

The processor 302 may be or include a general-purpose microprocessor, as a specialized co-processor or another type of data processing apparatus. In some examples, the processor 302 may be formed using one or more Boolean circuits, one or more arithmetic circuits, or a combination of Boolean and arithmetic circuits, although other types of circuits may be used to implement the processor 302. In some cases, the processor 302 performs high level operation of the data operator device 300. For example, the processor 302 may be configured to execute or interpret software, scripts, programs, functions, executables, or other instructions stored in the auxiliary storage device 304. In some instances, the processor 302 may execute the instructions by, for example, reading the instructions onto the memory 306 to perform operations and overall control of the data operator device 300.

The data operator device 300 shown in the example of FIG. 3 further includes a display device 308 (such as a display configured to display processed data), one or more I/O interfaces 310 to a peripheral device (e.g., a keyboard, a mouse, or any other peripheral device), and a transceiver device 312 (e.g., a modem or any device having a transmitter circuit and a receiver circuit). The transceiver device 312 may be configured to communicate signals formatted according to a wired or wireless communication standard or a cellular network standard such that the data operator device 300 can access the communication network 106 to transmit and receive data The various components of the data operator device 300 are communicatively coupled to one another via an interconnected bus 314. The various components of the data operator device 300 may be housed together in a common housing or other assembly. In some implementations, one or more of the components of data operator device 300 can be housed separately, for example, in a separate housing or other assembly.

During an example operation of the data operator device 300, the transceiver device 312 receives the homomorphically encrypted data from the data owner device 200. In some instances, the homomorphically encrypted data received from the data owner device 200 is stored in the memory 306. The processor 302 may access the auxiliary storage device 204 and read the instructions for executing homomorphic computation processing onto the memory 306. The processor 302 may subsequently execute the instructions to perform homomorphic computation processing on the homomorphically encrypted data, thus generating an encrypted result (e.g., the encrypted result 120 in FIG. 1). The encrypted result may be stored in the auxiliary storage device 304 or the memory 306. In some examples, the processor 302 may be formed using one or more Boolean circuits, one or more arithmetic circuits, or a combination of Boolean and arithmetic circuits, although other types of circuits may be used to implement the processor 302. The transceiver device 312 may transmit the encrypted result to the data owner device 200 via the communication network 106. In some examples, the data owner device 200 (e.g., the transceiver device 214 of the data owner device 200) receives the encrypted result from the data operator device 300 and stores the encrypted result in the memory 206. The processor 202 may access the auxiliary storage device 204 and read the instructions for executing homomorphic decryption onto the memory 206. The processor 202 may also access the secret key stored in the tamper-resistant storage device 208. The processor 202 may subsequently execute the instructions to homomorphically decrypt the encrypted result (e.g., encrypted result 120 in FIG. 1) using the secret key (e.g., the secret key 112 in FIG. 1), thus generating a plaintext result (e.g., the plaintext result 122 in FIG. 1). In some implementations, the plaintext result may be stored in the auxiliary storage device 204 or the memory 206.

As discussed above, homomorphic encryption may be performed by the first computing device 102 and the data owner device 200, while homomorphic computation processing may be performed by the second computing device 104 and the data operator device 300. Homomorphic encryption schemes allow computations on encrypted data without revealing its inputs or its internal states, thus preserving data privacy. The single instruction, multiple data (SIMD) technique has been used in some conventional homomorphic encryption schemes to reduce the computational expense of performing operations on homomorphically encrypted data. The SIMD technique allows a vector of plaintexts to be encrypted in a single ciphertext, with ciphertext operations corresponding to component-wise operations on its plaintext vector. Other vector manipulation operations can also be performed, including shifts and rotations of the entries in the vector, which can be leveraged to perform arbitrary permutations on the encrypted vector.

As discussed above, with SIMD, for index m and prime plaintext modulus p, the plaintext data lies in the plaintext vector space $(\mathbb{F}_{p^d})^k$, where $k \cdot d = \phi(m)$, and $\phi(\bullet)$ is the Euler totient function. Conventional schemes for applying the SIMD technique focus on the subspace $(\mathbb{F}_p)^k$, where base field elements (e.g., elements in $\mathbb{F}_p$) are placed in each plaintext slot. Consequently, conventional schemes for applying the SIMD technique do not exploit the complete space $(\mathbb{F}_{p^d})^k$, which offers finite extension field operations over $\mathbb{F}_{p^d}$.

In contrast to conventional schemes for applying the SIMD technique, various aspects of the present disclosure present an improved homomorphic encryption and computation processing scheme that efficiently packs more data into each plaintext slot. For example, various aspects of the present disclosure propose an encoding method that embeds vectors into finite field elements for improved homomorphic computation processing. The proposed encoding method allows the use of finite extension field operations to perform computation on encrypted data. The improved homomorphic encryption and computation processing scheme is termed field instruction, multiple data (FIMD) in this disclosure. Additionally, various aspects of the present disclosure introduce methods for applying reverse multiplication-friendly embedding (RMFE) to instances where the homomorphic plaintext space has a high extension degree (e.g., where p is a prime under 100) in order to pack even more data into each plaintext slot. For example, various aspects of the present disclosure use an RMFE scheme to encode a vector of elements in some finite field into a larger extension field that enables an unbounded number of component-wise multiplications on the vector of elements. For example, given the plaintext space $\mathbb{F}_{p^d}$, various aspects of the present disclosure present examples where a vector in $(\mathbb{F}_{p^{d'}})^{k'}$ is packed into $\mathbb{F}_{p^d}$, where $k' \cdot d' = O(d)$, thereby causing ciphertext operations to correspond to component-wise operations on encrypted vectors. As a result, homomorphic multiplication with RMFE-encoded vectors of the present disclosure is almost identical to SIMD.

Figure 4A:
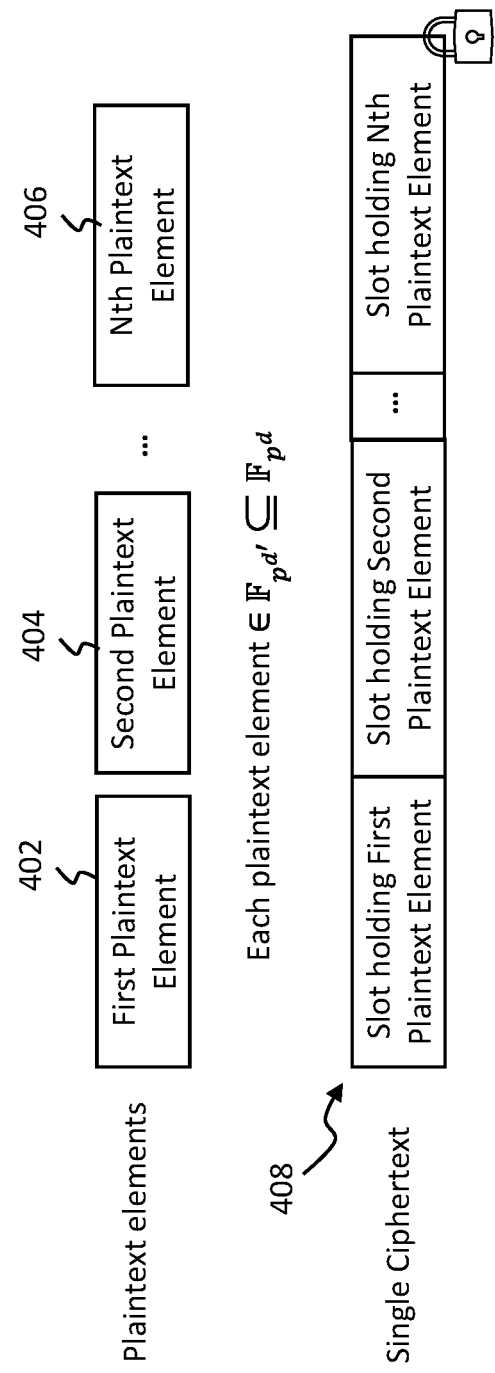
FIG. 4A is a diagram showing an example single instruction, multiple data (SIMD) technique where a vector of numbers is packed into slots of a single ciphertext, according to an implementation of the present disclosure.

FIG. 4A is a diagram showing an example single instruction, multiple data (SIMD) technique, according to an implementation of the present disclosure. In the example of FIG. 4A, where a vector of plaintext elements (including plaintext elements 402, 404, 406) is packed into a vector of plaintext slots of a single ciphertext 408. In the example of FIG. 4A, the first plaintext element 402 is packed into a first plaintext slot of the single ciphertext 408, the second plaintext element 404 is packed into a second plaintext slot of the single ciphertext 408, and the N th plaintext element 406 is packed into an $N^{th}$ plaintext slot of the single ciphertext 408. In contrast to conventional SIMD techniques where base field elements (e.g., elements in $\mathbb{F}_p$) are placed in each plaintext slot, this disclosure proposes a method of using an RMFE scheme to pack an element in $\mathbb{F}_{p^{d'}}$ in each plaintext slot of the ciphertext, where the finite field $\mathbb{F}_{p^{d'}}$ is a subfield of the finite extension field $\mathbb{F}_{p^d}$ (which is the plaintext space).

Figure 4B:
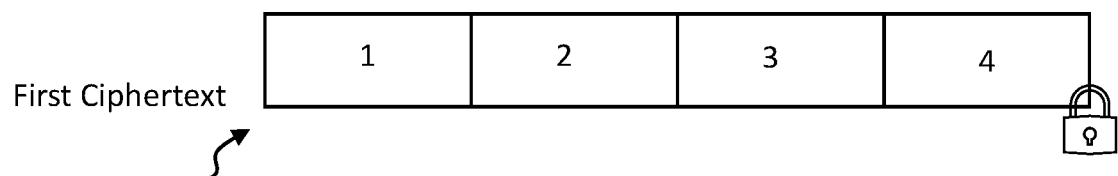
FIG. 4B is a diagram showing example ciphertext operations that correspond to component-wise operations on their plaintext vectors, according to an implementation of the present disclosure.
Figure 4B:
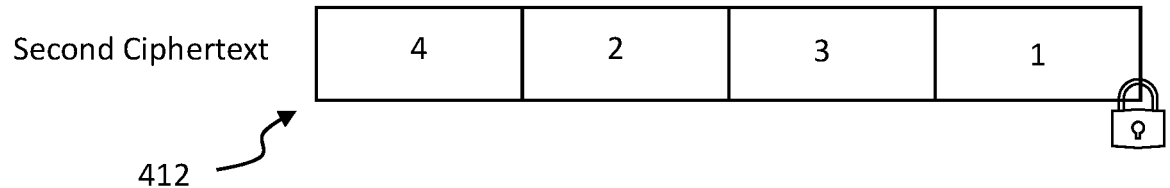
Figure 4B:
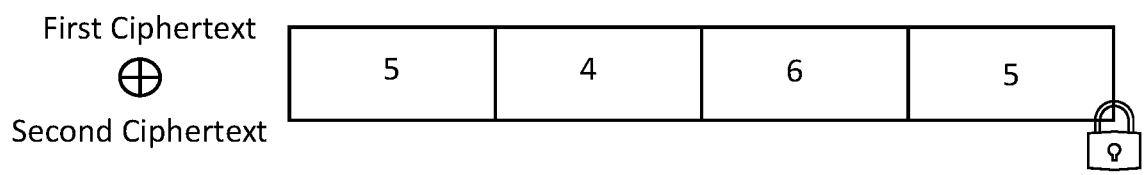
Figure 4B:
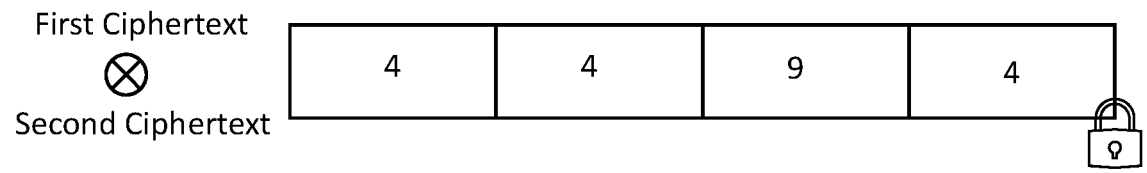

FIG. 4B is a diagram showing example ciphertext operations that correspond to component-wise operations on their plaintext vectors, according to an implementation of the present disclosure. The result is also a ciphertext with an equal number of slots. In contrast to conventional SIMD techniques, the ciphertexts operations discussed in this disclosure offer finite extension field operations over the finite extension field $\mathbb{F}_{p^d}$, e.g., since an element in $\mathbb{F}_{p^{d'}}$ in each plaintext slot is also an element in finite extension field $\mathbb{F}_{p^d}$. For the sake of simplicity and illustration, in the example of FIG. 4B, four integers 1, 2, 3, 4 are packed into a first ciphertext 410, and four other integers 4, 2, 3, 1 are packed into a second cipher text 412. Both the first and second ciphertexts 410, 412 are ciphertexts with four slots. SIMD operations on the first and second ciphertexts 410, 412 correspond to component-wise operations in their plaintext vectors. For example, addition of the first and second ciphertexts 410, 412 corresponds to component-wise additions, as illustrated in the example of FIG. 4B. As another example, multiplication of the first and second ciphertexts 410, 412 corresponds to component-wise multiplications. The result is also a ciphertext with four slots.

As discussed in further detail below, RMFE is not multiplicatively homomorphic. Therefore, various aspects of the present disclosure propose refreshing encoded vectors periodically, which is achieved by using a recode map, which is a combination of RMFE encode and decode procedures. The RMFE encode and decode procedures are $\mathbb{F}_{p^d}$-linear maps, thus allowing the recode map to be easily obtained and the tools available with homomorphic encryption to be applied. Various aspects of the present disclosure also propose composing any $\mathbb{F}_{p^d}$-linear map, T, with the recode map to simultaneously refresh and apply liner map T to the encoded vectors without computational overhead. To handle parameters that result in high extension degree plaintext spaces, various aspects of the present disclosure propose a new use of a composite RMFE scheme. For example, instead of evaluating the recode map of the composite RMFE scheme directly, various aspects of the present disclosure exploit the fact that a composite RMFE scheme is a composition of two component RMFE schemes and propose the use of a multi-stage (e.g., a two-stage or a three-stage) recode process. The multi-stage recode process reduces the complexity of recode operations for high degree extension fields (e.g., where p is a prime under 100) and allows recode operations to be used efficiently. Various aspects of the present disclosure also propose techniques for delaying applications of the recode operations.

For a better understanding of the present disclosure and for ease of reference, the present disclosure is separated into sections, and various concepts that are relevant to the various aspects of the present disclosure are now discussed.

Relevant Concepts from Fully Homomorphic Encryption

In a general aspect, a leveled fully homomorphic encryption (FHE) scheme can support L-depth circuits, where L is a parameter of the FHE scheme. In some examples, a leveled FHE scheme includes at least the following operations:

Key Generation: (pk, evk, sk)←KeyGen($1^\lambda$, L), where security parameter $\lambda$ and maximum depth L are provided as inputs to a key generation operation, and where public key pk, evaluation key evk and secret key sk are generated as outputs of the key generation operation.

Encryption: c=$\overline{m}$←Enc(pk, m), where public key pk and plaintext m∈P for a plaintext space P are provided as inputs to an encryption operation, and where a ciphertext c, which is an encryption of plaintext m, is generated as an output of the encryption operation.

Decryption: m'←Dec(sk, c), where secret key sk and ciphertext c are provided as inputs to a decryption operation, and where a plaintext m' is generated as an output of the decryption operation.

Evaluation: c'←Eval(evk, $\varphi$, $\overline{m}_1$, $\overline{m}_2$, . . . , $\overline{m}_n$), where evaluation key evk, an n-variate polynomial $\varphi$ of total degree≥$2^L$, and n ciphertexts $\overline{m}_1$, . . . , $\overline{m}_n$ are provided as inputs to an evaluation operation, and where a ciphertext c'=$\overline{\varphi(m_1,m_2,\ldots,m_n)}$ is generated as an output of the evaluation operation.

In relation to batching and Frobenius Map operations, some FHE schemes can support SIMD operations, also known as batching, by using Chinese Remainder Theorem on polynomial rings and by selecting a suitable parameter. For example, a cyclotomic polynomial modulus $\Phi_m(x)=\prod_{i=1}^{\ell} f_i(x)$ decomposes into $\ell$ irreducible factors of degree d modulo p, for a chosen plaintext characteristic p. Then, with the Chinese Remainder Theorem isomorphism $$\frac{Z_p[x]}{\Phi_m(x)} \cong \prod_{i=1}^{\ell} \frac{Z_p[x]}{f_i(x)} \cong \prod_{i=1}^{\ell} \mathbb{F}_{p^d},$$

$\ell$ many $\mathbb{F}_{p^d}$ elements can be encrypted in one ciphertext by encoding them into the various $$\frac{Z_p[x]}{f_i(x)}.$$

The expression $\mathbb{F}_{p^d}$ denotes a finite field with $p^d$ elements. The algebra of each $$\frac{Z_p[x]}{f_i(x)}$$

is $\mathbb{F}_{p^d}$ since $f_i(x)$ is an irreducible polynomial of degree d modulo p. As a result, the plaintext space of compatible FHE schemes can be partitioned into a vector of plaintext slots (e.g., as illustrated in the example of FIG. 4A), with a single addition or multiplication on ciphertexts resulting in component-wise addition or multiplication on the vector of plaintexts (e.g., as illustrated in the example of FIG. 4B). The plaintext algebra for these slots are finite extension fields $\mathbb{F}_{p^d}$, and some conventional homomorphic computation processing schemes perform rotation, shifts, and Frobenius map evaluations without consuming depth for the Brakerski-Gentry-Vaikuntanathan (BGV)-FHE scheme. A ring-large learning with errors (LWE) variant of Brakerski's LWE scheme (known in the field as the Brakerski-Fan-Vercauteren (BFV)-FHE scheme) can also be adapted to support these operations. Furthermore, a software library for homomorphic encryption, known in the field as HElib, implements some operations that fully utilize the plaintext space with BGV as the base FHE scheme.

Relevant Concepts from Finite Field Theory

Theorem 1 (The Subfield Criterion): Let $\mathbb{F}_q$ be the finite field with q:=$p^d$ elements. Then, every subfield of $\mathbb{F}_q$ has order $p^{d'}$, where d'|d. Conversely, for any divisor d' of d, there is exactly one subfield of $\mathbb{F}_q$ with $p^{d'}$ elements. To manipulate $\mathbb{F}_p$-vectors embedded in $\mathbb{F}_{p^d}$, $\mathbb{F}_p$-linear maps can be used. The $\mathbb{F}_p$-linear maps can be evaluated with constant multiplications and Frobenius map evaluations according to the method discussed in Theorem 2, which is presented below.

Theorem 2: Let q be a prime power and T be a $\mathbb{F}_q$-linear map on $\mathbb{F}_q$-vectors in $\mathbb{F}_{p^d}$ for some positive integer d. Denote by $\tau(x)$ the Frobenius map on $\mathbb{F}_{p^d}$ which sends x→$x^q$. There is a unique set of constants $\{\rho_0, \rho_1, \rho_{d-1}\}$, $\rho_i \in \mathbb{F}_{p^d}$, such that for any $\mathbb{F}_q$-vector u that is embedded as $\mu \in \mathbb{F}_{p^d}$, the following holds:

$$T(u) = \sum_{i=0}^{d-1} \rho_i \tau^i(\mu).$$

Proof of Theorem 2: To prove Theorem 2, a method of computing the constants $\rho_i$ that yields the linear map evaluation is presented. For example, let $\alpha$ be a generator of $\mathbb{F}_{q^d}^*$, i.e. $\mathbb{F}_{q^d} = \mathbb{F}_q(\alpha)$, and using the set $\{1, \alpha, \ldots, \alpha^{d-1}\}$ as a basis of $\mathbb{F}_{q^d}$ over $\mathbb{F}_q$ and identify vectors $(\alpha_0, \ldots, \alpha_{d-1}) \in \mathbb{F}_{q^d}$ with field elements $\Sigma_{i=0}^{d-1} \alpha_i \alpha^i \in \mathbb{F}_{q^d}$. Subsequently, $\rho_0, \ldots \rho_{d-1} \in \mathbb{F}_{q^d}$ can be found such that for all $\mu \in \mathbb{F}_{q^d}$, $\Sigma_{i=0}^{d-1} \rho_i \mu^{q^i} = T(\mu)$. In particular, for all $j=0, 1, \ldots, d-1$, the following holds:

$$\sum_{i=0}^{d-1} \rho_i(\alpha^j)^{q^i} = T(\alpha^j).$$

This equation yields a system of d equations in the d unknowns $\rho_0, \ldots, \rho_{d-1}$. Thus, this system of equations can be solved as follows. Consider a d×d matrix M where $M_{ij} = \alpha^{jq^i}$ and the matrix M is a Vandermonde matrix that is invertible. Consequently, the following holds:

$$(\rho_0, \ldots, \rho_{d-1}) = (T(1), \ldots, T(\alpha^{d-1})) M^{-1}.$$

This proof works even when T is a linear map that maps subspaces of $\mathbb{F}_{q^d}$ of dimension d' to any subspace of $\mathbb{F}_{q^d}$. In this case, T can be represented as a linearized polynomial with degree at most $q^{d'}$.

With regards to generating and evaluating $\mathbb{F}_q$-linear maps with FHE, using the proof of Theorem 2, any $\mathbb{F}_q$-linear map can be expressed as a series of Frobenius map evaluations and constant multiplications. There are several methods to evaluate $\mathbb{F}_q$-linear maps with Generation 2 HE schemes, such as the BGV- and BFV-FHE schemes; one or more of such methods are described by Halevi and Shoup (see S. Halevi and V. Shoup, "Bootstrapping for HElib," in *EUROCRYPT* 2015, *Part I*, 2015).

Reverse Multiplication-Friendly Embedding Scheme

In various aspects of the present disclosure, a reverse multiplication-friendly embedding (RMFE) scheme is applied to instances where the homomorphic plaintext space has a high extension degree in order to pack more data in each plaintext slot. For example, various aspects of the present disclosure use of an RMFE scheme to encode a vector of elements in some finite field into a larger extension field that preserves multiplication.

For prime power q and integers k, n≥1, a $(k, n)_q$-reverse multiplication friendly embedding (RMFE) scheme is a pair of $\mathbb{F}_q$-linear maps $\phi:(\mathbb{F}_q)^k \to \mathbb{F}_{q^n}$ and $\psi:\mathbb{F}_{q^n} \to (\mathbb{F}_q)^k$ such that, for all x, y $\in (\mathbb{F}_q)^k$, the following holds:

$$x*y = \psi(\phi(x) \cdot \phi(y)).$$

The $\mathbb{F}_q$-linear map $\phi:(\mathbb{F}_q)^k \to \mathbb{F}_{q^n}$ illustrates that a vector of elements in some finite field can be packed into an element that lies in a larger extension field.

There are two main families of RMFE schemes: a first family of RMFE schemes uses polynomial interpolation; and a second family of RMFE schemes uses algebraic function fields. The first family is restrictive since it is limited to vectors of length at most q+1, while the second family requires deep mathematics and is mostly used for proving theoretical results. The second family of RMFE schemes can be thought of as a generalization of the polynomial interpolation method provided by the first family of RMFE schemes, where points in $\mathbb{F}_q$ are replaced by more abstract "points" in function fields. The second family of RMFE that uses algebraic function fields is described in further detail below.

Theorem 3: In some aspects of the present disclosure, Theorem 3 is utilized to combine two RMFE schemes to obtain a composite RMFE scheme. For example, let $(\phi_2, \psi_2)$ be a $$(k_2, m_2)_{q^{m_2}} - RMFE$$

scheme and $(\phi_1, \psi_1)$ be a $$(k_1, m_1)_q - RMFE$$

scheme. In some implementations, the $(\phi_1, \psi_1)$ RMFE scheme may be termed an inner RMFE scheme, and the $(\phi_2, \psi_2)$ RMFE scheme may be termed an outer RMFE scheme. The $(\phi, \psi)$ composite RMFE scheme is a composite $$(k_1 k_2, m_1 m_2)_q - RMFE$$

scheme, where the following holds:

$$\phi: \mathbb{F}_q^{k_1 k_2} \to \mathbb{F}_{q^{m_1 m_2}}$$

$$(x_1, \ldots, x_{k_2}) \in \left(\mathbb{F}_q^{k_1}\right)^{k_2} \mapsto (\phi_1(x_1), \ldots, \phi_1(x_{k_2})) \in (\mathbb{F}_{q^{m_1}})^{k_2} \mapsto$$
$$\phi_2(\phi_1(x_1), \ldots, \phi_1(x_{k_2})) \in \mathbb{F}_{q^{m_1 m_2}}, \text{ and}$$

$$\psi: \mathbb{F}_{q^{m_1 m_2}} \to \mathbb{F}_q^{k_1 k_2}$$

$$\alpha \in \mathbb{F}_{q^{m_1 m_2}} \mapsto \psi_2(\alpha) \in \mathbb{F}_{q^{m_1}}^{k_2} \mapsto (\psi_1(u_1), \ldots, \psi_1(u_{k_2})) \in \mathbb{F}_q^{k_1 k_2}.$$

Figure 5:
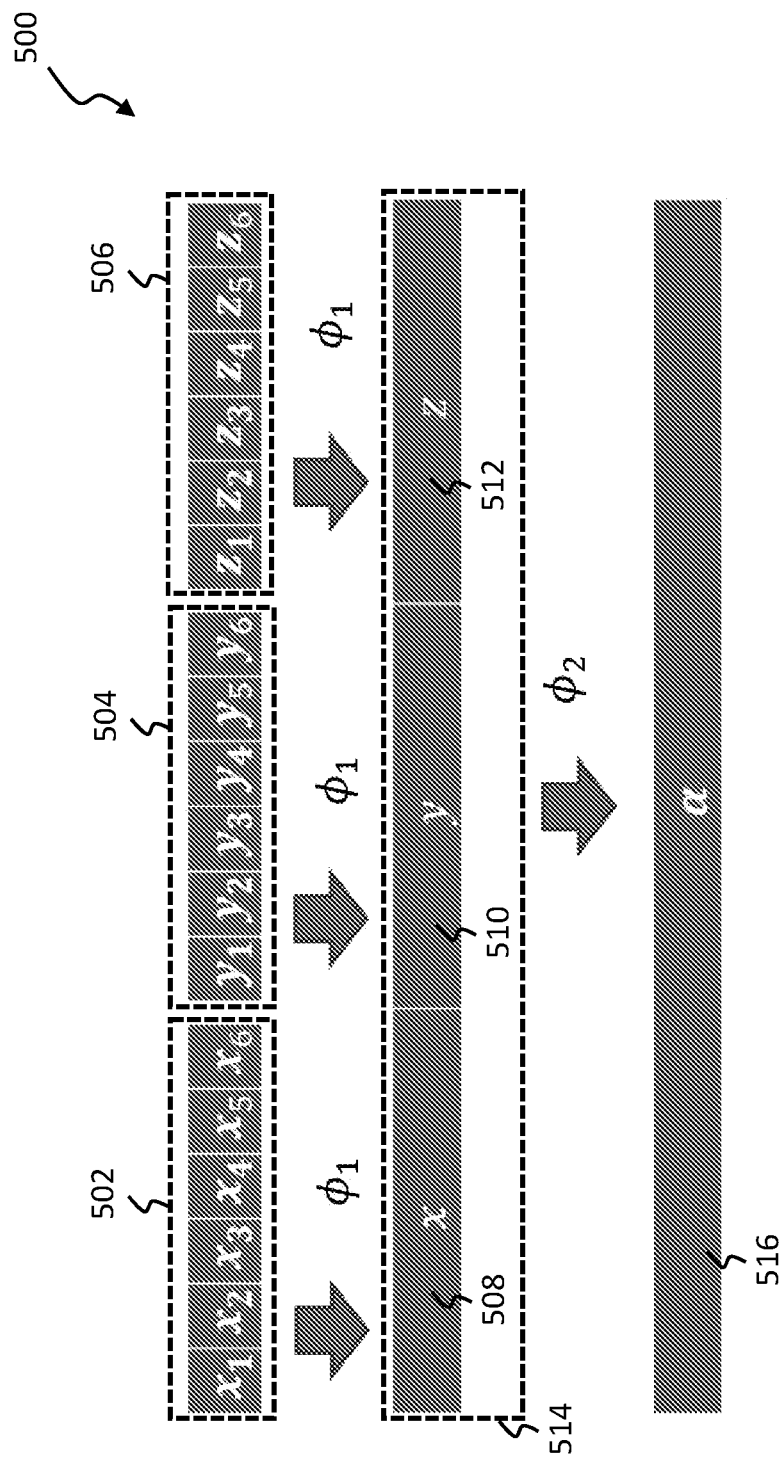
FIG. 5 shows an illustration of an example composite Reverse Multiplication-Friendly Embedding (RMFE) scheme, according to an implementation of the present disclosure.

FIG. 5 shows an illustration of an example composite RMFE scheme 500, according to an implementation of the present disclosure. The example composite RMFE scheme 500 illustrates how a vector of elements in some finite field can be encoded into an element in a larger extension field and how the composite RMFE scheme discussed in Theorem 3 can be advantageous in a homomorphic plaintext space that has a high extension degree in order to pack more data in each slot of a vector of plaintext slots. The example of FIG. 5 includes a first vector 502 having entries $x_2, x_3, x_4, x_5, x_6$. The first vector 502 lies in the vector space $\mathbb{F}_q^{k_1}$, where $k_1=6$ in the example of FIG. 5, and where each of the entries $x_i \in \mathbb{F}_q$, for i=1, 2, ..., 6. Similarly, the example of FIG. 5 includes a second vector 504 and a third vector 506. The second vector 504 has entries $y_2, y_3, y_4, y_5, y_6$, and lies in the vector space $\mathbb{F}_q^{k_1}$, where $k_1=6$ in the example of FIG. 5, and where each of the entries $y_i \in \mathbb{F}_q$, for i=1, 2, ..., 6. Similarly, the third vector 506 has entries $z_2, z_3, z_4, z_5, z_6$, and lies in the vector space $\mathbb{F}_q$, where $k_1=6$ in the example of FIG. 5, and where each of the entries $x_i \in \mathbb{F}_q$, for i=1, 2, ..., 6.

The ($\phi_1$, $\psi_1$) RMFE scheme packs the first vector 502 into an element x (identified in FIG. 5 as reference numeral 508) that lies in the field $\mathbb{F}_{q^{m_1}}$. The ($\phi_1$, $\psi_1$) RMFE scheme also packs the second vector 504 into an element y (identified in FIG. 5 as reference numeral 510) that lies in the field $\mathbb{F}_{q^{m_1}}$. Similarly, the ($\phi_1$, $\psi_1$) RMFE scheme also packs the third vector 506 into an element z (identified in FIG. 5 as reference numeral 512) that lies in the field $\mathbb{F}_{q^{m_1}}$. Elements x, y, z are entries of a fourth vector 514 that lies in the field $(\mathbb{F}_{q^{m_1}})^{k_2}$, where $k_2=3$ in the example of FIG. 5. The ($\phi_2$, $\psi_2$) RMFE scheme subsequently packs the fourth vector 514 into an element $\alpha$ (identified in FIG. 5 as reference numeral 516) that lies in the field $\mathbb{F}_{q^{m_1 m_2}}$. In the example of FIG. 5, 18 elements, each of which lies in the finite field $\mathbb{F}_q$, are encoded into a single element a that lies in the larger extension field $\mathbb{F}_{q^{m_1 m_2}}$. Consequently, the example composite RMFE scheme 500 shown in FIG. 5 illustrates how a vector of elements (e.g., first, second, and third vectors 502, 504, 506) having elements that lies in some finite field (e.g., $x_i$, $y_i$, $z_i \in \mathbb{F}_q$) can be encoded into an element (e.g., element $\alpha$) that lies in a larger extension field (e.g., $\alpha \in \mathbb{F}_{q^{m_1 m_2}}$).

A packing efficiency of an RMFE scheme can be used as a measure of the efficiency of the RMFE scheme. In some aspects of the present disclosure, the packing efficiency can be used to compare different RMFE schemes with one another to determine how well-utilized the target field is with respect to the length of vectors that the different RMFE schemes encode into it (i.e., the target field). For a (k, m)-RMFE scheme, packing efficiency is given by m/k. When the composite RMFE scheme of Theorem 3 is applied, the packing efficiency decreases from $$\frac{m_2}{k_2} \text{ to } \frac{m_2 m_1}{k_2 k_1}.$$

In the example of FIG. 5, the packing efficiency is given by $$\frac{m_2 m_1}{18}.$$

One way to improve the packing efficiency of the composite RMFE scheme is via the use of algebraic function fields, which allows for more point evaluations.

Polynomial Interpolation RMFE

Theorem 4: For all $1 \leq k \leq q+1$, there exists a $(k, 2k-1)_q$-RMFE scheme using polynomial interpolation, which can be constructed as follows. Let $\mathbb{F}_q[X]_{\leq m}$ denote the set of polynomials of degree at most m with coefficients in $\mathbb{F}_q$. Then, denote by S a set of pair-wise distinct points $\{x_1, x_2, \ldots, x_k\} \subseteq \mathbb{F}_q \cup \{\infty_{m+1}\}$, where $\infty_{m+1}$ is the symbol such that $f(\infty_{m+1})$ is the coefficient of $X^m$ for any polynomial $f \in \mathbb{F}_q[X]_{\leq m}$. Let $\alpha \in \mathbb{F}_{q^{2k-1}}$ such $\mathbb{F}_{q^{2k-1}} = \mathbb{F}_q(\alpha)$, then the following maps can be defined:

$\eta_1: \mathbb{F}_q[X]_{\leq k-1} \to (\mathbb{F}_q)^k; f \mapsto \eta_1(f) = (f(x_1), f_2(x), \ldots, f(x_k))$ $\eta_2: \mathbb{F}_q[X]_{2k-2} \to \mathbb{F}_{q^{2k-1}}; f \mapsto \eta_2(f) = f(\alpha)$.

These two maps are isomorphisms of $\mathbb{F}_q$-vector spaces, as shown in Theorems 11.13 and 11.96 of R. Cramer, I. Damgard and J. B. Nielsen, Secure Multiparty Computation and Secret Sharing, Cambridge University Press, 2015. Then, the following can be defined:

$\eta_1': \mathbb{F}_q[X]_{\leq 2k-2} \to (\mathbb{F}_q)^k; f \mapsto \eta_1'(f) = (f(x_1'), f_2(x_2'), \ldots, f(x_k'))$ where $x_i' := x_i$ if $x_i \in \mathbb{F}_q$ and $x_i' := \infty_{2k-1}$ if $x_i = \infty_k$. Then the following holds:

$\phi = \eta_n \circ \eta_1^{-1}$ and $\psi = \eta_1' \circ \eta_2^{-1}$.

Field Instruction, Multiple Data (FIMD) Technique

Various aspects of the present disclosure illustrate that in the proposed FIMD technique, the plaintext space for the BGV- and BFV-FHE schemes can be viewed as a vector in $(\mathbb{F}_p)^{k \cdot \ell}$ with component-wise addition, multiplication, rotations and shifts. In the SIMD technique, the plaintext space of the BGV- and BFV-FHE schemes is a vector of finite extension field elements $(\mathbb{F}_{p^d})^\ell$ for some integers d and $\ell$. In an analogous manner, the FIMD technique proposed in various aspects of the present disclosure (e.g., in the example of FIG. 5) allows $\mathbb{F}_p$-vectors of some length k to be encoded to elements in $\mathbb{F}_{p^d}$ when d>1 such that entry-wise addition and multiplications can approximately be mapped to field addition and multiplication.

Encoding $\mathbb{F}_p$-vectors into $\mathbb{F}_{p^{d'}}$: Let ($\phi$, $\psi$) be a (k, d')$_p$-RMFE scheme, where d divides d'. Then, according to Theorem 1, this RMFE scheme encodes vectors in $(\mathbb{F}_p)^k$ (e.g., $\mathbb{F}_p$-vectors of some length k) to an element of $\mathbb{F}_{p^{d'}}$, which can be embedded into the unique subfield of $\mathbb{F}_{p^d}$ that is isomorphic to it.

Example 1: This example is provided to illustrate the encoding of $\mathbb{F}_p$-vectors into $\mathbb{F}_{p^d}$ for the FIMD technique proposed in various aspects of the present disclosure. For simplicity, the encoding/decoding process is illustrated on plaintext vectors of numbers and polynomials with a polynomial interpolation-based RMFE scheme. Suppose p=5, and the finite extension field is $\mathbb{E} = \mathbb{F}_{5^9}$, then up to 5 $\mathbb{F}_5$ elements can be encoded into $\mathbb{E}$. Suppose also that the vector $(1, 3, 4, 2, 1) \in (\mathbb{F}_5)^5$ is packed into $\mathbb{E}$. To effect such a packing, a polynomial of degree not more than 4 is initially found, namely, $f(x) = \Sigma_{i=0}^4 f_i x^i$ such that $(1, 3, 4, 2, 1) = (f(0), f(1), f(2), f(3), f(4))$. Then, the representation $\mathbb{E} = \{h(t) = \Sigma_{i=0}^8 h_i t^i\}$ can be used, where t is the root of an irreducible degree 8 polynomial g(x), and f(x) is embedded into $f(t) = \Sigma_{i=0}^4 f_i t^i \in \mathbb{E}$. Decoding any element in $\mathbb{E}$ is done by treating that element h(t) as a polynomial h(x) and evaluating it over the points 0, 1, ..., 4, i.e., computing (h(0), h(1), ..., h(4)).

As shown above, the proposed FIMD technique encodes $\mathbb{F}_p$-vectors of some length k to elements in $\mathbb{F}_{p^d}$ when d>1, thus yielding an encrypted FIMD vector. The following paragraphs describe how to perform homomorphic computation processing on encrypted FIMD vectors.

Component-wise Additions for FIMD: With FIMD encrypted vectors, ciphertext addition corresponds to entry-wise addition of the underlying $\mathbb{F}_p$-vectors. To add constant $\mathbb{F}_p$-vectors to encrypted vectors, the constant $\mathbb{F}_p$-vectors are first encoded with the RMFE scheme that was used to generate the FIMD encrypted vectors. Encoding the constant $\mathbb{F}_p$-vectors produces field elements that can then be added to FIMD encrypted vectors after being encoded again with SIMD into the appropriate plaintext elements. Stated differently, the field elements can be encoded with SIMD into appropriate plaintext elements, and the appropriate plaintext elements can then be added component-wise to the FIMD encrypted vectors.

Component-wise Multiplications for FIMD (Simple Case): RMFE is not multiplicatively homomorphic. Therefore, encoded vectors may need to be refreshed periodically, which can be achieved by using a recode map, which is a combination of RMFE encode and decode procedures. For encrypted FIMD vectors, ciphertext multiplication does not always directly translate to component-wise multiplication. This is because RMFE schemes cannot be repeatedly applied without additional conditions. To overcome this limitation of RMFE schemes, the present disclosure proposes a recode operation for the RMFE scheme $(\phi, \psi)$ (e.g., the composite $(k_1, k_2, m_1, m_2)_q$-RMFE scheme presented in Theorem 3). The recode operation can be expressed as follows:

$$\text{recode: } \mathbb{F}_{p^d} \to \mathbb{F}_{p^d}$$

$$x \mapsto \phi(\psi(x)).$$

The recode operation obtains a new $\mathbb{F}_{p^d}$ element that is a freshly encoded result of the multiplication. The recode operation is a $\mathbb{F}_p$-linear map since it is the composition of the two $\mathbb{F}_p$-linear maps $\phi$ and $\psi$. The series of operations for an FIMD multiplication of two encrypted vectors can therefore be summarized as follows:

Operation 1 for FIMD Multiplication: Ciphertext multiplication, thus obtaining a result ciphertext c*.

Operation 2 for FIMD Multiplication: Evaluating the recode linear map on c* to obtain a reusable ciphertext c'.

Linearized Polynomial Representation of encode, decode and recode operations: Theorem 2 can be used to obtain the linearized polynomial representation of the recode map, i.e. computing the constants $\rho_0, \ldots, \rho_{d-1} \in \mathbb{F}_{q^d}$ such that $\text{recode}(\mu) = \sum_{i=0}^{d-1} \rho_i \mu^{q^i}$. Suppose the $(k, 2k-1)_p$-RMFE scheme is used from polynomial interpolation, then for all $i = 0, 1, \ldots, 2k-2$, the following holds:

$$\text{recode}(\alpha^i) = (\phi \circ \psi)(\alpha^i).$$

Following the proof of Theorem 2, the linearized polynomial representation of the recode map can be obtained.

Alternate Representation for recode operations: In general, a recode operation maps a subspace of dimension d to a subspace of dimension k, which means its kernel has dimension d−k. This means that a polynomial K(x) can be found whose roots belong to the kernel of the recode map, i.e. if recode($\mu$)=0, then K($\mu$)=0, and K(x) is therefore a factor of recode(x). Therefore, the linearized polynomial representation of the recode map can be expressed as follows:

$$\text{recode}(x) = \lambda_0 K(x) + \lambda_1 K(x) + \ldots + \lambda_k K(x)^{q^k} + \lambda_{k+1} G(x),$$

where G(x) is a linearized polynomial of degree$\leq q^{d-k}$. Since recode(x) mod K(x)=0, it follows that G(x)=0. Therefore, recode(x)=H (K(x)), where $H(x) = \lambda_k x^{q^k} + \lambda_{k-1} x^{q^{k-1}} + \ldots + \lambda_0$. If either H(x) or K(x) has few non-zero terms, then it might be computationally efficient to evaluate this form.

Example 1 (Continued): This example is an extension of Example 1 discussed above and is provided to illustrate component-wise multiplication and decoding for the FIMD technique proposed in various aspects of the present disclosure. Suppose two vectors (1, 3, 4, 2, 1) and (1, 1, 2, 1, 2) are respectively encoded to two polynomials f, g and embedded in $\mathbb{E}$ as f(t), g(t). To obtain their component-wise product, i.e. (1, 3, 3, 2, 2), the embedded field elements are multiplied (e.g., f(t)×g(t)) to obtain the result g (t). Since the degree of fg(t) is 8, fg(x) as a polynomial is the same as f(x)g(x), the decoded output can be expressed as follows:

$$(fg(0), fg(1), fg(2), fg(3), fg(4)) = (f(0)g(0), f(1)g(1), \ldots, f(4)g(4))$$

$$= (1, 3, 3, 2, 2)$$

The product of 3 encoded elements results in a polynomial of degree 12, exceeding the degree of t.

Component-wise Multiplications for FIMD (General Case): In the simple case of component-wise multiplications for the FIMD technique proposed in this disclosure, a recode operation is applied after each multiplication. However, instead of having to apply the recode operation after each multiplication, the recode operation can be deferred and applied after e multiplications. To illustrate this, the general case of component-wise multiplications for the FIMD technique is applied to the $(k, 2k-1)_p$-RMFE scheme from Theorem 4. Suppose that the plaintext space $\mathbb{F}_{p^d}$ is such that, $2^e(k-1)+1 \leq d$, the construction in Theorem 4 can be modified, with $\mathbb{F}_{p^d} = \mathbb{F}_p(\alpha)$ such that the following holds:

$$\eta_1: \mathbb{F}_p[X]_{\leq k-1} \to (\mathbb{F}_p)^k; f \mapsto \eta_1(f) = (f(x_1), f(x_2), \ldots, f(x_k))$$

$$\eta_2: \mathbb{F}_p[X]_{k-2} \to \mathbb{F}_{p^d}; f \mapsto \eta_n'(f) = f(\alpha).$$

Then, the following can be defined:

$$\eta_1^*: \mathbb{F}_p[X]_{\leq d} \to (\mathbb{F}_q)^k; f \mapsto \eta_1^*(f) = (f(x_1'), f(x_2'), \ldots, f(x_k'))$$

where $x_i' := x_i$ if $x_i \in \mathbb{F}_q$ and $x_i' := \infty_{2^{e-1}(2k-1)}$ if $x_i = \infty_k$. Accordingly, $$\phi' = \eta_2' \circ \eta_1^{-1} \text{ and } \psi' = \eta_1^* \circ \eta_2^{-1}.$$

With this RMFE scheme, length-k $\mathbb{F}_p$-vectors are encoded and e multiplications can be performed before a recode operation is performed. In essence, the recode operation evaluates the $\mathbb{F}_p$-linear map $\psi' \circ \phi'$ on the resulting ciphertext. Intuitively, the key to the general case of component-wise multiplications for the FIMD technique is that there is sufficient "space" when the condition $2^e(k-1)+1 \leq d$ is imposed such that "polynomial coefficients" encoded as field elements do not wrap around (modulo g(t) in the Example 1).

Linear Map Evaluation: Instead of considering shifts and rotations on encrypted $\mathbb{F}_p$-vectors, a more general notion of evaluating an $\mathbb{F}_p$-linear map on it is considered. Let $\pi$ be the linear map for evaluating the encrypted vectors on. As with $(\phi, \psi)$ from an RMFE scheme, Theorem 2 is used to generate the constants that enable evaluation with linearized polynomials. However, some optimizations can be performed if encoded vectors are multiplied before evaluating $\pi$. One of these optimizations is an optimized post-multiplication linear map evaluation, discussed below.

Optimized Post-Multiplication Linear Map Evaluation: Since $\phi, \psi, \pi$ are $\mathbb{F}_p$-linear maps, they can be combined into a single linear map that outputs the permuted vector while simultaneously recoding it for further multiplications. Thus, the recode operation and application of the $\pi$ map can be given by:

$$\text{recode}_\pi: \mathbb{F}_{p^d} \to \mathbb{F}_{p^d}$$

$$x \mapsto \phi(\pi(\psi(x))).$$

Thus, for optimal use of linear map evaluations, the recode$_\pi$ is generated so that the linear map evaluations can be applied after multiplications as well as normal use (without any multiplications).

Efficient Three-Stage Recode Process for a Composite RMFE Scheme and High Extension Degree Fields For certain homomorphic encryption (HE) parameters, the decomposition discussed in the section entitled "Relevant Concepts from Fully Homomorphic Encryption" yields high extension degree d and low number of slots $\ell$. For fixed prime p, RMFE schemes from polynomial interpolation and algebraic function fields might not be able to fully utilize the plaintext space. However, HE presents another challenge for parameters that yield high extension degree. While a $(\kappa, \delta)_p$-RMFE scheme can always be found such that $\delta$ is as close to d as possible, the complexity of evaluating the various linear maps of the proposed FIMD technique, which would require at least d key-switching operations, can be prohibitively large. Therefore, the present disclosure also proposes an alternative approach that uses fewer key-switching evaluations at the expense of a lower packing efficiency.

According to Theorem 1, there is a copy of every field $\mathbb{F}_{p^{d'}}$, where d'|d, embedded in the plaintext space $\mathbb{F}_{p^d}$. By the theory of field extensions, $\mathbb{F}_{p^d}$ can be represented as $\mathbb{F}_{p^{d'}}[x]/g(x)$ for some irreducible (in $\mathbb{F}_{p^{d'}}$) polynomial of degree d/d'. Therefore, two RMFE schemes can be found—an inner (k, d')$_p$-RMFE scheme $(\phi_1, \psi_1)$ and an outer (k', f)$_{p^{d'}}$-RMFE scheme $(\phi_2, \psi_2)$ which would compose to a (kk', fd')$_p$-RMFE $(\phi^*, \psi^*)$ by Theorem 3 with fd' being as close to d as possible. Without further action, the recode operation would involve linearized polynomials with at least fd' monomials.

The fact that the above-described composite RMFE scheme reduces the complexity of evaluating its recode map can be taken advantage of. Instead of applying the direct recode map $\phi^* \circ \psi^*$, which requires at least ed' Frobenius automorphisms to evaluate, a three-stage recode process is adopted: an outer decode operation; an inner recode operation; and an outer encode operation. First, a set of decode maps, $\{\psi_i\}_{i=1}^{k'}$, is defined. The set of decode maps $\{\psi_i\}_{i=1}^{k'}$ decodes the outer RMFE scheme and returns only the ith entry of the vector. Using this outer vector of k' entries, k' ciphertexts are obtained that each encrypts a single entry of the outer vector. Each entry of the outer vector packs k $\mathbb{F}_p$ elements with the inner RMFE scheme and its recode $(\psi_1 \circ \phi_1)$ map can be applied to each ciphertext to "refresh" the inner encoding. Finally, the k' "refreshed" ciphertexts are recombined into one element, encrypting the vector of k' inner field elements and applying a single encode map to enable FIMD operations again.

Figure 6:
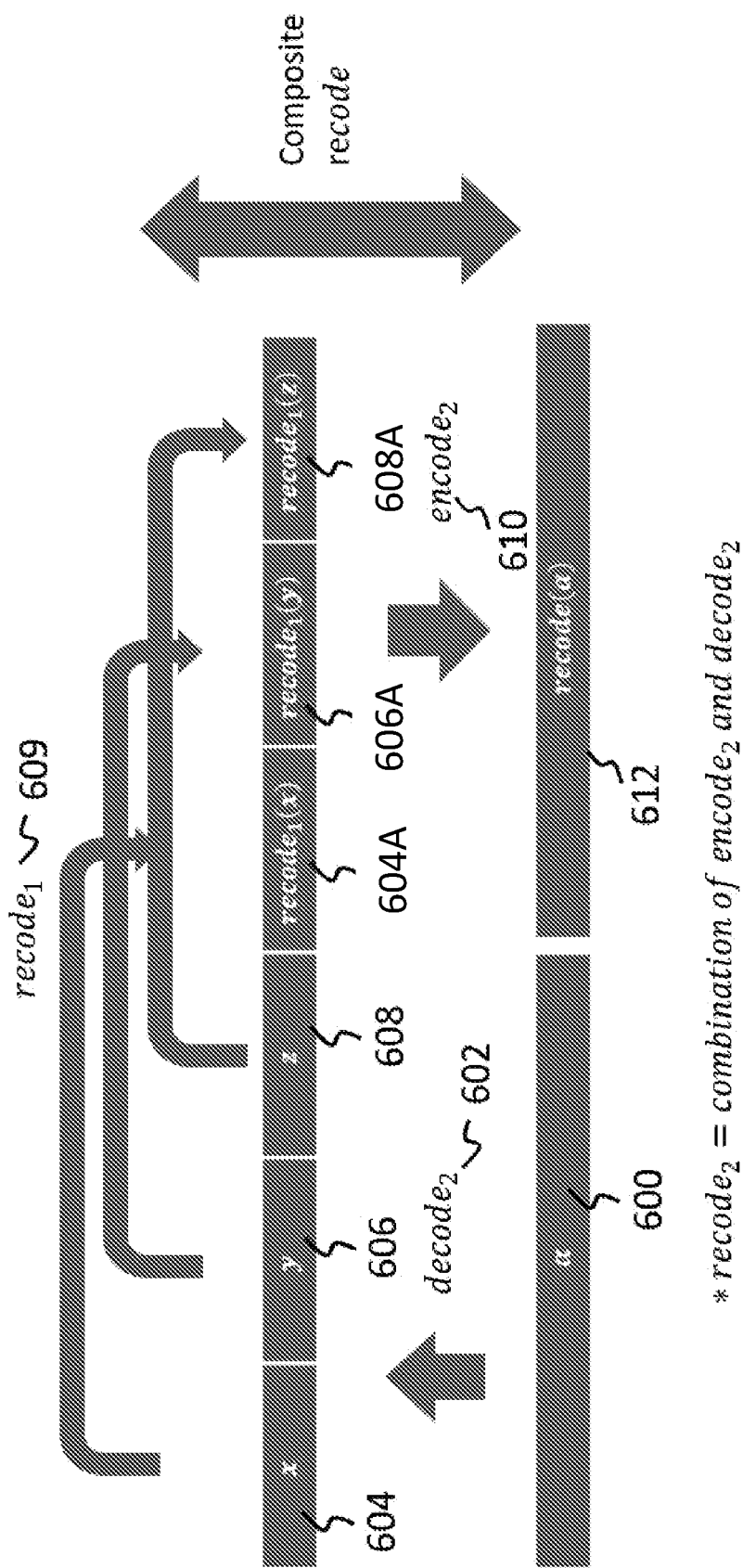
FIG. 6 illustrates an example three-stage recode process for an example composite RMFE scheme, according to an implementation of the present disclosure.

FIG. 6 illustrates an example three-stage recode process for an example composite RMFE scheme, according to an implementation of the present disclosure. In the example of FIG. 6, the ciphertext encrypting the element $\alpha \in \mathbb{F}_{q^{m_1 m_2}}$ is denoted with reference numeral 600 and is decoded using operation 602. In operation 602, each map $\psi_i$ of the set of decode maps $\{\psi_i\}_{i=1}^{3}$ is applied to the ciphertext encrypting $\alpha$ to respectively return a first ciphertext 604, a second ciphertext 606, and a third ciphertext 608 respectively encrypting x, y, z $\in \mathbb{F}_{q^{m_1}}$. The ciphertexts 64, 606, 608 form an outer vector. Each entry of the outer vector packs 6 $\mathbb{F}_p$ elements with the inner RMFE scheme, and its recode $(\psi_1 \circ \phi_1)$ map (shown in FIG. 6 as operation 609) can be applied to each ciphertext 604, 606, 608 to "refresh" the inner encoding. In the example of FIG. 6, the recode operation 609 is applied to first ciphertext 604 to produce refreshed ciphertext 604A. Similarly, the recode operation 609 is applied to second ciphertext 606 to produce refreshed ciphertext 606A, and to the third ciphertext 608 to produce refreshed ciphertext 608A. Finally, the refreshed ciphertexts 604A, 606A, 608A are recombined using operation 610. In operation 610, the refreshed ciphertexts 604A, 606A, 608A are packed into a single ciphertext and then the outer RMFE scheme is applied (e.g., a single encode map is applied) to recombine the "refreshed" ciphertexts 604A, 606A, 608A into a ciphertext encrypting the "refreshed" $\alpha \in \mathbb{F}_{q^{m_1 m_2}}$ (where the "refreshed" ciphertext is shown in FIG. 6 as element 612), thus enabling FIMD operations again.

The complexity of the three-stage recode process can be determined by determining the number of key-switching operations for each of the operations of the three-stage process discussed above. In the first operation of the three-step recode process (e.g., the outer decode operation), a set of k' decode-like maps is evaluated. Naively done, this would require up to k'd/d' Frobenius automorphisms (and thus key-switching operations); however, since the automorphisms are all done on the same ciphertext, we can apply d/d' Frobenius automorphisms once and use these automorphisms repeatedly for each of the k' decode-like maps. Therefore, the first operation of the three-stage recode process (e.g., the outer decode operation) requires up to d/d' key-switching operations.

In the second operation of the three-stage recode process (e.g., the inner recode operation), the inner recode map is evaluated to each of the k' ciphertexts, thus using k'd' key-switching operations. In the third operation of the three-stage recode process (e.g., the outer encode operation), the "refreshed" entries are combined into a single encrypted vector with $(\alpha_0', \ldots, \alpha_{k'-1}') \mapsto \Sigma_{i=0}^{k'-1} \alpha_i' \gamma^i$, where $\{1, \gamma, \ldots, \gamma^{d/d'-1}\}$ forms a basis for the extension $\mathbb{F}_{p^d}/\mathbb{F}_{p^{d'}}$. Since the embedding maps subspaces of dimension k'−1, k' key-switching operations are needed to evaluate it. Therefore, the three-stage recode process uses up to $$\frac{d}{d'} + k'(d'+1) < d$$

key-switching operations since $$k' < \frac{f}{2} < \frac{d}{2d'}.$$

Besides the complexity of the technique, the number of key-switching matrices required for computation can be determined, assuming one matrix per unique automorphism. The first stage of the recode operation requires evaluating $x^{(p^{d'})^i}$ for i=0, ..., d/d'; since i=0 when $x^{p^0}=x$, d/d'−1 key-switching matrices are used. In the second stage, the inner recode map is applied to each of the k' ciphertexts from the previous stage. This map requires evaluating $x^{p^j}$ for j=0, ..., d'; as before, no automorphisms are needed for j=0, and j=d' corresponds to $x^{(p^{d'})^1}$ from the first stage. Therefore, d'−2 key-switching matrices are used in the second stage. Finally, the last stage uses a subset of the automorphisms used for the first stage; thus the total number of key-switching matrices needed is $$\frac{d}{d'} + d' - 3,$$

compared to d if direct recode is used. This can be combined with other techniques such as the Baby-Step-Giant-Step automorphism scheme (e.g., described in S. Halevi and V. Shoup, "Faster Homomorphic Linear Transformations in HElib," in *Advances in Cryptology—CRYPTO 2018—38th Annual International Cryptology Conference, Proceedings Part I*, Santa Barbara, 2018) to reduce the number of key-switching matrices further.

As such, with the three-stage recode process for a composite RMFE scheme and high extension degree fields, arbitrary linear maps on inner vectors can be applied using the techniques of discussed above with regards to homomorphic computation processing on encrypted FIMD vectors. Furthermore, arbitrary linear maps can be performed on outer vectors by adjusting how the "refreshed" inner field elements are recombined into one ciphertext.

General-Case Multiplication with the Efficient Three-Stage Recode Process: For a composite RMFE scheme (e.g. illustrated in FIG. 4), the general case component-wise multiplications for FIMD discussed above is less effective for several reasons. First, both inner and outer RMFE schemes need enough overhead so that the result of several multiplications does not overflow and cause decoding to fail. This means that the following conditions are needed:

$$2^e(k-1)+1 \leq d' \text{ and } 2^e(k-1)+1 \leq f,$$

which implies that $4^e(k-1)k'-1+2^{e+1}(k+k'-2)+1 \leq d$ to support e multiplications in the general case. However, with the proposed three-stage recode process, things can be done differently. With the inner recode operation (e.g., operation recode1 in FIG. 6) and outer recode operation (e.g., the combination of operations 602 and 610 in FIG. 6) decoupled, the outer recode operation can be performed as many times as needed without affecting the inner RMFE encoding. For example, let $\alpha$ and $\beta \leq \alpha$ be the number of multiplications desired before performing the inner recode operation and the outer recode operation, respectively. Then, k, k' is chosen under the following restriction: $2^\alpha(k-1)+1 \leq d'$ and $2^\beta(k'-1)+1 \leq f$ such that $2^{\alpha+\beta}(k-1)(k'-1)+(2^\alpha k+2^\beta k'-2^\alpha-2^\beta)+1 \leq d$. With this setup, multiplications can be performed as follows:

For every $\beta$ multiplications, the outer recode2 map $\phi_2 \circ \psi_2$ is applied (or recode2 and $\pi$ map, $\phi_2 \circ \pi \circ \psi_2$, for any linear map $\pi$ on the vector of outer field elements); and For every $\alpha$ multiplications, the three-stage recode process described above (e.g., illustrated in FIG. 6) is applied (with the option to apply various linear maps on the vector of numbers encoded as inner field elements by applying the recode1 and $\pi$ map, ($\phi_1 \circ \pi \circ \psi_1$).

If there is a need to apply outer (or inner, respectively) linear maps before $\beta$ (or $\alpha$, respectively) multiplications are reached, the outer recode and $\pi$ map are applied (or three-stage recode process with an inner linear map, respectively).

Efficient Two-Stage Recode Process for a Composite RMFE Scheme and High Extension Degree Fields Two methods for performing the recode process in two stages are introduced. In each of these methods, two recode maps are applied consecutively. In a first one of these methods, an inner recoding map is applied before an outer recoding map; in a second one of these methods, an outer recoding map is applied before in inner recoding map. The two component RMFE schemes in the composite RMFE scheme can be denoted as inner $(k, d')_p$-RMFE scheme ($\phi_1$, $\psi_1$) and outer $(k', f)_{p^{d'}}$-RMFE scheme ($\phi_2$, $\psi_2$), and the composite RMFE scheme can be denoted as $(kk', fd')_p$-RMFE scheme ($\phi^*, \psi^*$). The composite recode$_{comp}$ maps x∈ $\mathbb{F}_{p^d}$ to x*=recode$_{comp}$(x)=$\phi_2(\phi_1(\psi_1(\psi_2(x)))) \in \mathbb{F}_{p^d}$. Its image has dimension kk' and is isomorphic to $\mathbb{F}_p^{kk'}$ and for any x* in it, we have recode(x*)=x*.

Inner Recoding followed by Outer Recoding: As mentioned above, a first one of the methods for performing the recode process in two stages involves applying an inner recoding map before an outer recoding map. Instead of the standard inner recode$_1 = \phi_1 \circ \psi_1$, a different inner recoding map can be given by the following:

$$\text{recode}_{in}^*: \mathbb{F}_{p^d} \to \mathbb{F}_{p^d}$$

$$x \mapsto x^*+a_x,$$

where $a_x \in \text{Ker}(\text{recode}_2)$ for recode$_2 = \phi_2 \circ \psi_2$. With these two maps, the following recode process is provided:

$$\text{recode}_{comp} = \text{recode}_2 \circ \text{recode}_{in}^*$$

The proof of the recode process shown above is a simple verification. For example, for any x∈ $\mathbb{F}_{p^d}$.

$$\begin{aligned}
\text{recode}_{comp}(x) &= \text{recode}_2(\text{recode}_{in}^*(x)) \\
&= \text{recode}_2(x^* + a_x) \\
&= x^* + \text{recode}_2(a_x) \\
&= x^*
\end{aligned}$$

Coefficients for recode$_{in}^*$ when Inner Recoding is followed by Outer Recoding: To derive the coefficients for recode$_{in}^*$, let $P(x)=a_0+a_1 x^p + \ldots + a_{kd'-1} x^{p^{kd'-1}}$ for some $a_0, \ldots, a_{kd'-1} \in \mathbb{F}_{p^d}$. For each i=0, 1, . . . , kd'−1, write $a_i = \sum_{j=0}^{d/d'-1} b_{i,j} \gamma_j$, where $$\left\{ \gamma_0, \ldots, \gamma_{\frac{d}{d'}-1} \right\}$$

is a basis of $\mathbb{F}_{p^d}$ over $\mathbb{F}_{p^{d'}}$. By the definition of recode$_2$, it has nullity d/d'−k, meaning Ker(recode$_2$) has dimension d/d'−k over $\mathbb{F}_{p^{d'}}$. Let $\{\beta_1, \ldots, \beta_{d/d'-k}\}$ be a basis of Ker(recode$_2$), then write recode$_{in}^*(x) = x^* + c_{1,x} \beta_1 + \ldots + c_{d/d'-k,x} \beta_{d/d'-k,x}$ for some $c_{1,x}, \ldots c_{d/d'-k,x} \in \mathbb{F}_{p^{d'}}$. With a basis of $\mathbb{F}_{p^{d'}}$ over $\mathbb{F}_p$, say $\{\omega_1, \ldots, \omega_{d'}\}$, the set $\{\omega_i \gamma_j\}$ forms a basis of $\mathbb{F}_{p^d}$ over $\mathbb{F}_p$. Thus, for i=1, . . . , d' and j=1, . . . , d/d', the expression $P(x_{i,j})=x_{i,j}^* + c_{1,x_{i,j}} \beta_1 + \ldots + c_{i,x_{i,j}} \beta_{d/d'-k}$ is desired, where $x_{i,j} = \omega_i \gamma_j$. Altogether, this yields d equations in the variables $a_i$ and $c_{i,x_{i,j}}$. Expanding each equation in terms of the variables $b_{i,j}$ and comparing the coefficients with respect to $\gamma_j$s, it can be verified that a system of $d^2/d'$ equations in as many unknowns over $\mathbb{F}_{p^{d'}}$ is obtained. With high probability, the system can be solved and the values for $b_{i,j}$ give the desired coefficients for the linearized polynomial P(x) that is used. If the equation system does not admit any solutions, another set of kd' powers of p in the range from 0 to d−1 can be chosen instead of the smallest kd' integers as presented at the beginning.

Complexity of Inner Recoding followed by Outer Recoding: To determine the complexity of this method, note that there are kd' p-linearized monomials in P(x) and so it requires kd'+d/d' key-switching keys and a similar number of operations to compute.

Outer Recoding followed by Inner Recoding: As mentioned above, a second one of the methods for performing the recode process in two stages involves applying an outer recoding map before an inner recoding map. To this end, the following inner and outer recode maps are defined:

$\text{recode}_{out}^*: \mathbb{F}_{p^d} \to \mathbb{F}_{p^d}$ $x \mapsto \phi_2(\psi_2(x)) + u_x$ $\text{recode}_{in}^*: \text{Im}(\text{recode}_{out}^*) \to \mathbb{F}_{p^d}$ $x \mapsto x^*$ where $u_x \in \text{Im}(\phi_2 \circ \psi_2) \cap \text{Ker}(\psi_1)$, and $\text{recode}_{out}^*$ is a $\mathbb{F}_{p^d}$-linear map over $\mathbb{F}_{p^d}$ with a k-dimensional $\mathbb{F}_{p^d}$-subspace of $\mathbb{F}_{p^d}$ as its image, $\text{Im}(\text{recode}_{out}^*)$. As a $\mathbb{F}_p$-linear map over $(\mathbb{F}_{p^d})^k$, has a kernel of dimension $(d/d'-k')k$ and following a similar analysis as set forth above for the inner recoding followed by outer recoding, $\text{recode}_{out}^*$ can be evaluated with a $p^{d'}$-linearized polynomial containing $d/d'-\lfloor k(d'-k')/d' \rfloor$ $p^{d'}$-linearized monomials. Therefore, an $\mathbb{F}_p$-linear map can be defined over $\text{Im}(\text{recode}_{out}^*)$, $\text{recode}_{in}^*$ that recodes the inner RMFE-encoded data. Furthermore, $\text{Im}(\text{recode}_{out}^*)$ is a kd'-dimensional $\mathbb{F}_p$-subspace of $\mathbb{F}_{p^d}$, and $\text{recode}_{in}^*$ can be represented as a p-linearized polynomial with kd' p-linearized monomials. As a result, $\text{recode}_{comp} = \text{recode}_{in}^* \circ \text{recode}_{out}^*$, since for any $x \in \mathbb{F}_{p^d}$, the following holds:

$\text{recode}_{in}^* \cdot \text{recode}_{out}^*(x) = \text{recode}_{in}^*(\phi_2(\psi_2(x)) + u_x)$ $= (\phi_2(\psi_2(x)))^* = x^*$

Generalizing RMFE via Algebraic Function Fields

As discussed above, there are two main families of RMFE schemes: a first family of RMFE schemes uses polynomial interpolation; and a second family of RMFE schemes uses algebraic function fields. The second family of RMFE schemes can be thought of as a generalization of the polynomial interpolation method provided by the first family of RMFE schemes, where points in $\mathbb{F}_q$ are replaced by more abstract "points" in function fields.

In polynomial interpolation, suppose the existence of a base field $\mathbb{F}_q$ for some $q=p^e$, where p is some prime and extension $e \geq 1$. The evaluation points used in polynomial interpolation can be expressed as points $\{x_1, \ldots, x_k\}$, where $x_i \in \mathbb{F}_q$. In RMFE schemes based on polynomial interpolation, the polynomial in the target field $\mathbb{F}_{q^m}$ can be expressed as $\{\alpha_0 + \alpha_1 t + \ldots + \alpha_{m-1} t^{m-1} \mod g(t), \alpha_i \in \mathbb{F}_q\}$ for some irreducible polynomial $g(t) = \Sigma_{i=0}^m g_i t^i$, where $m \geq 2k-1$. Based on these parameters, the encode and decode operations in RMFE schemes based on polynomial interpolation can be expressed as follows:

Encode: $(a_1, \ldots, a_k) \mapsto f(t) = \Sigma_{i=0}^{k-1} f_i t^i \in \mathbb{F}_{q^d}$, with $a_i = f(x_i)$ Decode: $h(t) = \Sigma_{i=0}^{m-1} h_i t^i \in \mathbb{F}_{q^m} \mapsto (h(x_1), \ldots, h(x_k))$ In algebraic function fields, evaluation points are generalized to places and divisors. As an example, evaluation places (e.g., of degree 1) can be polynomials evaluated to points in $\mathbb{F}_q$, and the target place (e.g., of degree m) can be polynomials evaluated to points in $\mathbb{F}_{q^m}$. Additionally, a divisor G can be expressed as $\Sigma_{i=1}^l c_i P_i$, where $P_i$ are places, and $c_i$ are integers for some finite l. Additionally, in algebraic function fields, general polynomials are polynomials situated in a space. An example space can be a Riemann-Roch space (e.g., function space), which can be expressed as $\mathcal{L}(G = \Sigma_{i=1}^l c_i P_i) = 0$ and the set of polynomials that "evaluate to 0" at $P_i$ with $c_i < 0$ and poles (e.g., that evaluate to infinity) at $P_i$ with $c_i > 0$. The degree(G) = $\Sigma_{i=1}^l c_i \cdot \text{degree}(P_i)$. Additionally, f, $g \in \mathcal{L}(G)$, and $f \cdot g \in \mathcal{L}(2G)$.

Based on the above, polynomial interpolation can be interpreted in terms of algebraic function fields. Specifically, polynomial interpolation can be approximated to RMFE on rational function fields where genus $g=0$. In this example, evaluation points are places $\{P_1, \ldots, P_k\}$ (e.g., of degree 1), the target field are a place R (e.g., of degree m), and divisor G is such that G does not contain evaluation places and $\dim \mathcal{L}(G) - \dim \mathcal{L}(G - \Sigma_{i=1}^l P_i) = k$, and $m > 2 \cdot \text{degree}(G)$. When degree(G) = k-1, then $m \geq 2k-1$. Based on these parameters, the encode and decode operations in RMFE schemes based on polynomial interpolation can be approximated as follows:

Encode: $(a_1, \ldots, a_k) \in \mathbb{F}_q^k \mapsto f \in W \mapsto f(R) \in \mathbb{F}_{q^m}$, where $\mathbb{F}_q^k \simeq W$ is a subspace of $\mathcal{L}(G)$ Decode: $fg(R) \in \mathbb{F}_{q^m} \mapsto fg \in \mathcal{L}(2G) \mapsto (fg(P_1), \ldots, fg(P_k)) \in \mathbb{F}_q^k$ Additionally, RMFE on rational function fields can be generalized where genus $g \geq 0$. In this example, evaluation points are places $\{P_1, \ldots, P_k\}$ (e.g., of degree 1), the target field are a place R (e.g., of degree m), and divisor G is such that G does not contain evaluation places. If $m \geq 2k+4g-1$, then a (k, m)-RMFE scheme exists, and divisor G is selected such that degree(G) = k+2g-1. Based on these parameters, the encode and decode operations in generalized RMFE schemes based on function fields can be approximated as follows:

Encode: $(a_1, \ldots, a_k) \in \mathbb{F}_q^k \mapsto f \in W \mapsto f(R) \in \mathbb{F}_{q^m}$, where $\mathbb{F}_q^k \simeq W$ is a subspace of $\mathcal{L}(G)$ Decode: $fg(R) \in \mathbb{F}_{q^m} \mapsto fg \in \mathcal{L}(2G) \mapsto (fg(P_1), \ldots, fg(P_k)) \in \mathbb{F}_q^k$

Experiments

An experiment was conducted to compare the performance of encrypted integer order comparisons using FIMD and SIMD techniques to compare their relative performance in real situations. The other main methods for vector encodings were also included in the experiment to determine the FIMD technique's effectiveness against them. Results of this experiment are presented below in Table 1.

TABLE 1

Performance of encrypted integer order comparisons for various primes and techniques, one HE parameter per prime

| | En-coding | Num Packed | Capa-city | log q | log pq | Amor-tized Time (sec.) | Rela-tive Per-formance |
|---|---|---|---|---|---|---|---|
| p = k = 5 11-bit integers | FIMD | 1400 | 240 | 243.769 | 350.995 | 0.0115 | 1 |
| | SIMD | 280 | 200 | 223.91 | 323.566 | 0.0151 | 1.313 |
| p = k = 7 19-bit integers | FIMD | 1512 | 290 | 298.898 | 409.285 | 0.0267 | 1 |
| | SIMD | 216 | 240 | 243.78 | 351.135 | 0.0395 | 1.479 |
| p = k = 11 38-bit integers | FIMD | 838 | 350 | 358.908 | 505.043 | 0.0646 | 1 |
| | SIMD | 76 | 300 | 313.984 | 460.12 | 0.1169 | 1.810 |
| p = 13, k = 12 44-bit integers | FIMD | 782 | 400 | 411.372 | 560.227 | 0.0972 | 1 |
| | SIMD | 65 | 300 | 313.218 | 459.333 | 0.1634 | 1.681 |

As the results in Table 1 show, the FIMD technique exceeds the performance of SIMD techniques when the same HE parameters are used. The main difference is that the FIMD technique requires slightly more capacity than the SIMD technique for correctness. For the HE parameters chosen, the SIMD technique can accommodate larger values for k at the same HE parameters, but with larger capacities needed for evaluation correctness. Alternatively, the SIMD technique can evaluate comparison for the same values of k at better performance (although the improvement for the SIMD technique does not lead to it outperforming the FIMD technique) given optimal parameters. In cases where the HE parameters cannot be flexibly chosen, the FIMD technique offers a good solution to pack more into a single ciphertext with efficient amortized performance.

An experiment was also conducted to compare the performance of encrypted integer equality comparisons using FIMD and SIMD techniques to compare their relative performance in real situations. The other main methods for vector encodings were also included in the experiment to determine the FIMD technique's effectiveness against them. Results of this experiment are presented below in Table 2.

TABLE 2

Performance of encrypted integer equality comparisons for various primes and techniques, one HE parameter per prime

| | Encoding | Num Packed | Capacity | log q | log pq | Amortized Time (sec.) | Relative Performance |
|---|---|---|---|---|---|---|---|
| $p = k = 5$ 11-bit integers | FIMD | 1400 | 240 | 243.77 | 351.00 | 0.0014 | 1 |
| | SIMD | 280 | 200 | 223.91 | 323.57 | 0.0098 | 7 |
| $p = k = 7$ 19-bit integers | FIMD | 1512 | 290 | 298.90 | 409.29 | 0.0022 | 1 |
| | SIMD | 216 | 240 | 243.78 | 351.14 | 0.0273 | 12.409 |
| $p = k = 11$ 38-bit integers | FIMD | 838 | 350 | 358.91 | 505.04 | 0.0036 | 1 |
| | SIMD | 76 | 300 | 313.98 | 460.12 | 0.0844 | 23.444 |
| $p = 13$, $k = 12$ 44-bit integers | FIMD | 782 | 400 | 411.37 | 560.23 | 0.0051 | 1 |
| | SIMD | 65 | 300 | 313.22 | 459.33 | 0.1167 | 22.882 |

As the results in Table 2 show, the improvements obtained from the FIMD technique are much greater compared to the results from Table 1. This is because the FIMD technique can operate with schemes using finite extension fields, and such schemes use almost the same number of multiplications and automorphism computations in both cases; however, the FIMD technique packs much more data than the SIMD technique. In this case, the FIMD technique does not require the stated capacity for correct computation. However, the capacity for the FIMD technique was not reduced because systems could require both equality and order comparisons in the same system, and it is better to observe the performance gap in scenarios closer to practice.

An experiment was also conducted to consider the performance of the FIMD scheme compared to the SIMD scheme when computing base-p full adder circuits. The other main methods for vector encodings were also included in the experiment to determine the FIMD technique's effectiveness against them. Results of this experiment are presented below in Table 3.

TABLE 3

Performance of encrypted integer full adder (modulo pk) for various primes and techniques, one HE parameter per prime

| | Encoding | Num Packed | Capacity | log q | log pq | Amortized Time (sec) | Relative Performance |
|---|---|---|---|---|---|---|---|
| $p = k = 5$ 11-bit integers | FIMD | 1400 | 250 | 268.61 | 351.14 | 0.0231 | 1 |
| | SIMD | 280 | 200 | 223.91 | 323.57 | 0.0273 | 1.182 |
| $p = k = 7$ 19-bit integers | FIMD | 1512 | 330 | 341.42 | 500.42 | 0.0535 | 1 |
| | SIMD | 216 | 240 | 243.78 | 351.14 | 0.0744 | 1.391 |
| $p = k = 11$ 38-bit integers | FIMD | 838 | 420 | 429.89 | 584.74 | 0.1529 | 1 |
| | SIMD | 76 | 300 | 313.98 | 460.12 | 0.2191 | 1.433 |
| $p = 13$, $k = 12$ 44-bit integers | FIMD | 782 | 440 | 447.29 | 610.39 | 0.2038 | 1 |
| | SIMD | 65 | 300 | 313.22 | 459.33 | 0.2982 | 1.463 |

As the results in Table 3 show, the general trend is similar to the integer comparison experiment, with the FIMD technique outperforming the SIMD technique by around 20-40%, but the improvement is not as large as the previous experiments. With the FIMD technique, slightly more capacity was also required compared to integer comparison, while the SIMD technique's parameters were unchanged. Overall, the FIMD technique improves the amortized performance of the SIMD technique by encoding more data in a single ciphertext.

Figure 7:
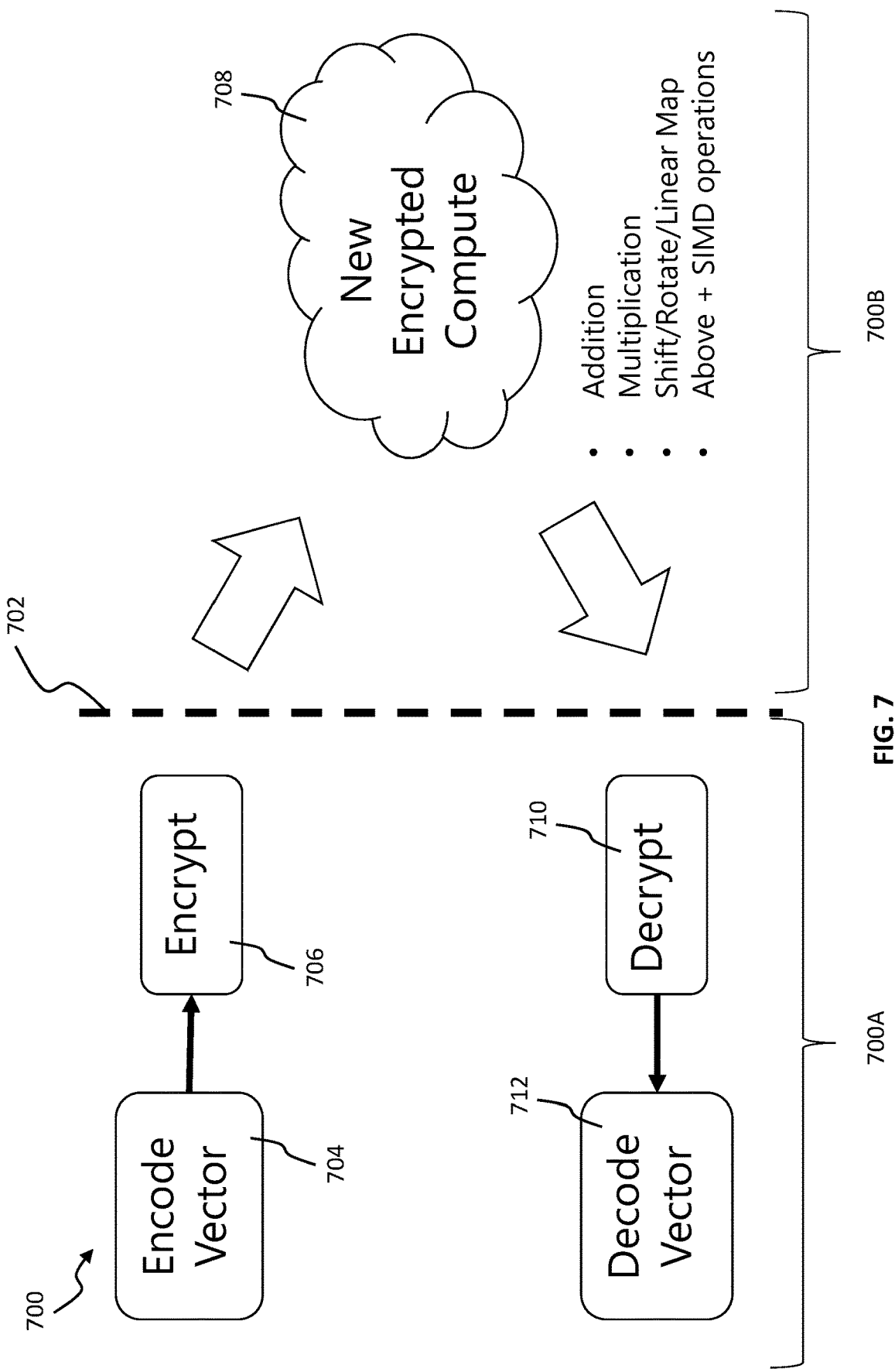
FIG. 7 is a schematic diagram showing example operations performed in a computing environment, according to an implementation of the present disclosure.

FIG. 7 is a schematic diagram showing example operations 700 performed in a computing environment, according to an implementation of the present disclosure. The example operations 700 can be grouped into a first group of operations 700A and a second group of operations 700B that are separated by a privacy barrier 702. The first group of operations 700A includes operation 704 of encoding a vector (e.g., to generate an encoded vector), and operation 706 of encrypting the encoded vector. The second group of operations 700B may be performed following operation 706. In some implementations, the second group of operations 700B are homomorphic computation processing 708 performed on the encrypted result of operation 706. In some examples, the homomorphic computation processing 708 are finite extension field operations over the finite extension field $\mathbb{F}_{p^d}$, and includes addition (e.g., component-wise additions for FIMD, as discussed above), multiplication (e.g., component-wise additions for FIMD with one or more recode operations, as discussed above), shift/rotate/permute/linear maps evaluations, or a combination thereof. The homomorphic computation processing 708 may yield a result, and following the homomorphic computation processing 708, operation 712 of decrypting the result is performed (e.g., to generate a decrypted vector), followed by operation 714 of decoding the decrypted vector.

Figure 8:
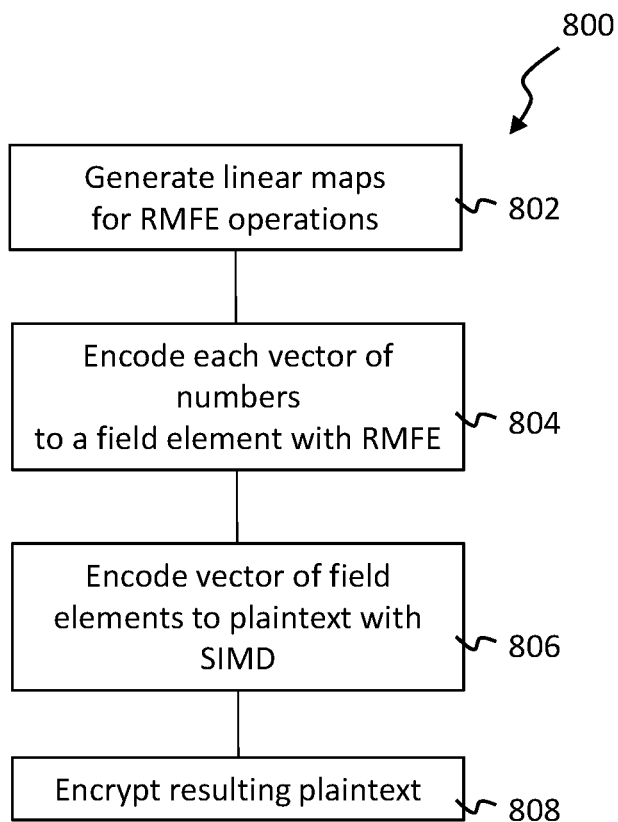
FIG. 8 shows a flowchart showing an example process performed, for example, to encode a vector and to encrypt an encoded vector, according to an implementation of the present disclosure.

FIG. 8 shows a flowchart showing an example process 800 performed, for example, to encode a vector and to encrypt an encoded vector, according to an implementation of the present disclosure. The example process 800 may, as an example, be used to perform operations 704 and 706 shown in FIG. 7. The example process 800 may include additional or different operations, and the operations may be performed in the order shown or in another order. In some cases, one or more of the operations shown in FIG. 8 can be implemented as processes that include multiple operations, sub-processes or other types of routines. In some cases, operations can be combined, performed in another order, performed in parallel, iterated, or otherwise repeated or performed in another manner.

The example process 800 includes generating required linear maps for RMFEs operations (at 802). For example, the linear maps and the encode, decode, recode map coefficients described above may be generated at 802. In some implementations, other desired linear transformations may also be generated at 802. The example process 800 includes encoding each vector of numbers (or elements) to a respective field element with the RMFE scheme (at 804). In some implementations, the direct RMFE scheme or the composite RMFE scheme discussed above may be used at 804. At 804, each $\mathbb{F}_p$ vector of some length (e.g., k) is encoded to a respective field element of $\mathbb{F}_{p^{d'}}$, which is a subspace of $\mathbb{F}_{p^d}$. The example process 800 includes encoding a vector of field elements to plaintext with SIMD (at 806). In some implementations, at 806, the respective field elements, each being an element of $\mathbb{F}_{p^{d'}}$, is arranged into a plaintext vector. The example process 800 includes encrypting the plaintext vector (e.g., using a homomorphic encryption scheme, examples being the BGV- and BFV-FHE schemes or any FHE encryption scheme), thus generating a ciphertext (at 808).

Figure 9:
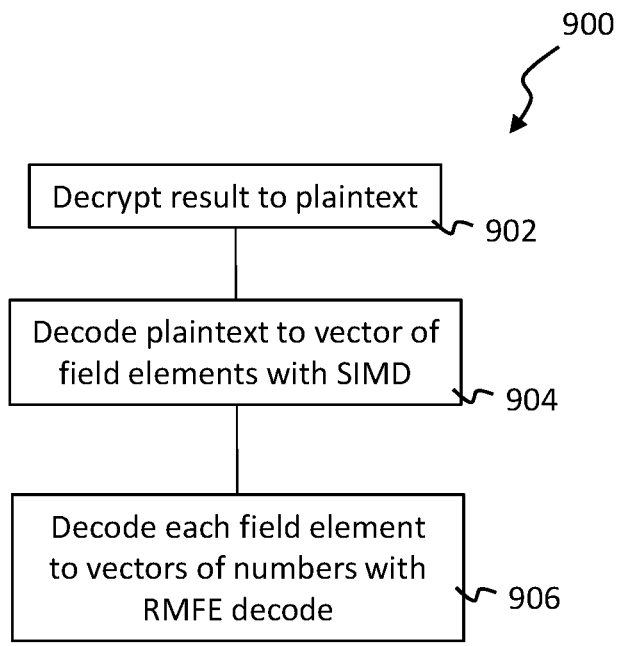
FIG. 9 shows a flowchart showing an example process performed, for example, to decrypt a result and to decode a decrypted result, according to an implementation of the present disclosure.

FIG. 9 shows a flowchart showing an example process 900 performed, for example, to decrypt a result and to decode a decrypted result, according to an implementation of the present disclosure. The example process 900 may, as an example, be used to perform operations 710 and 712 shown in FIG. 7. The example process 900 may include additional or different operations, and the operations may be performed in the order shown or in another order. In some cases, one or more of the operations shown in FIG. 9 can be implemented as processes that include multiple operations, sub-processes or other types of routines. In some cases, operations can be combined, performed in another order, performed in parallel, iterated, or otherwise repeated or performed in another manner.

The example process 900 includes decrypting an encrypted result to plaintext (at 902). In some implementations, at 902, a plaintext vector is generated having field elements, each being an element of $\mathbb{F}_{p^{d'}}$. The example process 900 includes decoding the plaintext to a vector of field elements with SIMD (at 904). The example process 900 also includes decoding each field element (e.g., of $\mathbb{F}_{p^{d'}}$) to a respective vector of numbers (or elements) with an RFME scheme. Each vector may be an $\mathbb{F}_p$ vector of some length (e.g., k).

Figure 10:
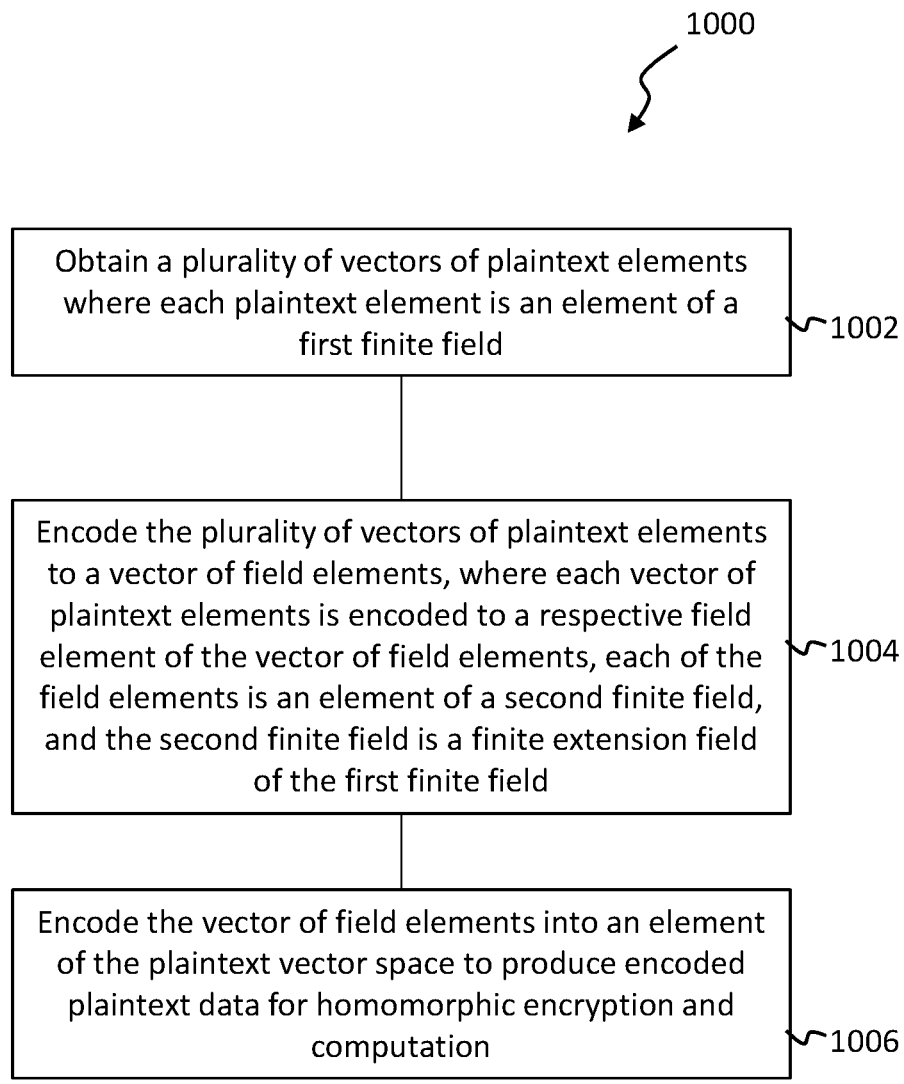
FIG. 10 is a flowchart showing an example process performed, for example, by a computing device in a computing environment, according to an implementation of the present disclosure.

FIG. 10 is a flowchart showing an example process 1000 performed, for example, by a computing device in a computing environment, according to an implementation of the present disclosure. The process 1000 may be suitable for generating encoded plaintext data in a plaintext vector space (e.g., $\mathbb{F}_{p^d}$). The example process 1000 may include additional or different operations, and the operations may be performed in the order shown or in another order. In some cases, one or more of the operations shown in FIG. 100 can be implemented as processes that include multiple operations, sub-processes or other types of routines. In some cases, operations can be combined, performed in another order, performed in parallel, iterated, or otherwise repeated or performed in another manner.

At 1002, a plurality of vectors of plaintext elements are obtained. In some examples, each plaintext element is an element of a first finite field (e.g., $\mathbb{F}_p$). As an example of 1002, the plurality of vectors 502, 504, 506 shown in FIG. 5 may be obtained. Each plaintext element $x_i$, $y_i$, $z_i \in \mathbb{F}_q$, where the finite field $\mathbb{F}_q$ of FIG. 5 can be the first finite field.

At 1004, the plurality of vectors of plaintext elements are encoded to a vector of field elements. In some examples, each vector of plaintext elements is encoded to a respective field element of the vector of field elements. Each of the field elements may be an element of a second finite field (e.g., $\mathbb{F}_{p^{d'}}$), and the second finite field may be a finite extension field of the first finite field (e.g., $\mathbb{F}_p$). As an example of 1004, the vectors 502, 504, 506 are respectively encoded to elements 508, 510, 512 of the vector 514. Each element 508, 510, 512 lies in the field $\mathbb{F}_{q^{m_1}}$, which can be the second finite field and a finite extension field of $\mathbb{F}_q$.

At 1006, the vector of field elements is encoded into an element of the plaintext vector space to produce the encoded plaintext data for homomorphic encryption and computation. As an example of 1006, the vector 514 is encoded to element 516, which lies in the field $\mathbb{F}_{q^{m_1 m_2}}$ (e.g., the plaintext vector space). In some instances, homomorphic encryption and computation can include encrypting the encoded plaintext data to produce a ciphertext, and performing homomorphic computation on the ciphertext. Performing homomorphic computation on the ciphertext can include: generating a plurality of linear maps based on the encoded plaintext data; performing, on the ciphertext, a decoding operation of an outer recode operation based on a first linear map of the plurality of linear maps, the decoding operation generating an outer vector of ciphertexts; performing, on each entry of the outer vector of ciphertexts, an inner recode operation based on a second linear map of the plurality of linear maps, the inner recoding operation generating a respective refreshed ciphertext, the respective refreshed ciphertexts forming a refreshed outer vector of ciphertexts; and performing, on the refreshed outer vector of ciphertexts, an encoding operation of the outer recode operation based on the first linear map, the encoding operation generating a refreshed ciphertext encrypting the plaintext data.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In a general aspect, data is encoded for homomorphic computation and homomorphic computation is performed on the encoded data.

In a first example, a method for generating encoded plaintext data in a plaintext vector space includes obtaining a plurality of vectors of plaintext elements, where each plaintext element is an element of a first finite field. The method further includes encoding the plurality of vectors of plaintext elements to a vector of field elements, where each vector of plaintext elements is encoded to a respective field element of the vector of field elements, each of the field elements is an element of a second finite field, and the second finite field is a finite extension field of the first finite field. The method additionally includes encoding the vector of field elements into an element of the plaintext vector space to produce the encoded plaintext data. The method further includes encrypting the encoded plaintext data to produce a ciphertext (e.g., the ciphertext 600 encrypting the element $\alpha \in \mathbb{F}_{q^{m_1 m_2}}$) and performing homomorphic computation on the encoded plaintext data. In some instances, performing homomorphic computation includes: generating a plurality of linear maps based on the encoded plaintext data; performing, on the ciphertext, a decoding operation (e.g. operation 602) of an outer recode operation based on a first linear map of the plurality of linear maps, where the decoding operation generates an outer vector of ciphertexts (e.g., vector of ciphertext entries 604, 606 608); performing, on each entry of the outer vector of ciphertexts, an inner recode operation (e.g., operation 609) based on a second linear map of the plurality of linear maps, the inner recoding operation generating a respective refreshed ciphertext (e.g., respective refreshed ciphertexts 604A, 606A, 608A), the respective refreshed ciphertexts forming a refreshed outer vector of ciphertexts (e.g., the vector having refreshed ciphertexts 604A, 606A, 608A as entries); and performing, on the refreshed outer vector of ciphertexts, an encoding operation (e.g., operation 610) of the outer recode operation based on the first linear map, the encoding operation generating a refreshed ciphertext (e.g., refreshed ciphertext 612) encrypting the plaintext data.

Implementations of the first example may include one or more of the following features. Encoding the plurality of vectors of plaintext elements to the vector of field elements may be based on a first reverse multiplication friendly embedding (RMFE) scheme (e.g., an ($\phi_1$, $\psi_1$)-RMFE scheme), and encoding the vector of field elements into the element of the plaintext vector space is based on a second RMFE scheme (e.g., a ($\phi_2$, $\psi_2$)-RMFE scheme). In some instances, each of the first RMFE scheme and the second RMFE scheme may include generating a respective polynomial that lies in the plaintext vector space. In some instances, the first RMFE scheme includes generating a respective encoded element based on a respective algebraic function field, and the second RMFE scheme includes generating a respective polynomial. Performing the inner recode operation based on the second linear map in the first example may include performing a first transformation on the second linear map to generate the respective refreshed ciphertext, where the first transformation includes an optimized post-multiplication linear map evaluation (e.g., described above in paragraph [0073]). Performing the encoding operation of the outer recode operation based on the first linear map in the first example may include a performing a second transformation on the first linear map to generate the refreshed ciphertext encrypting the plaintext data., where the second transformation includes a linear map evaluation with linearized polynomials (e.g., described above in paragraph [0072]). The outer recode operation may be performed prior to the inner recode operation. The inner recode operation may be performed prior to the outer recode operation.

In a second example, a system for generating encoded plaintext data in a plaintext vector space includes a memory, and at least one processor communicatively coupled to the memory and configured to perform operations of the first example. In a third example, a non-transitory computer-readable medium for generating encoded plaintext data in a plaintext vector space stores instructions that are operable when executed by data processing apparatus to perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method for generating encoded plaintext data in a plaintext vector space, comprising:
    obtaining a plurality of vectors of plaintext elements, wherein each plaintext element is an element of a first finite field;
    encoding the plurality of vectors of plaintext elements to a vector of field elements, wherein each vector of plaintext elements is encoded to a respective field element of the vector of field elements, each of the field elements is an element of a second finite field, and the second finite field is a finite extension field of the first finite field;
    encoding the vector of field elements into an element of the plaintext vector space to produce the encoded plaintext data;
    encrypting the encoded plaintext data to produce a ciphertext; and
    performing homomorphic computation on the ciphertext, wherein performing homomorphic computation comprises:
        generating a plurality of linear maps based on the encoded plaintext data;
        performing, on the ciphertext, a decoding operation of an outer recode operation based on a first linear map of the plurality of linear maps, the decoding operation generating an outer vector of ciphertexts;
        performing, on each entry of the outer vector of ciphertexts, an inner recode operation based on a second linear map of the plurality of linear maps, the inner recoding operation generating a respective refreshed ciphertext, the respective refreshed ciphertexts forming a refreshed outer vector of ciphertexts; and
        performing, on the refreshed outer vector of ciphertexts, an encoding operation of the outer recode operation based on the first linear map, the encoding operation generating a refreshed ciphertext encrypting the plaintext data.

2. The method of claim 1, wherein encoding the plurality of vectors of plaintext elements to the vector of field elements is based on a first reverse multiplication friendly embedding (RMFE) scheme, and encoding the vector of field elements into the element of the plaintext vector space is based on a second RMFE scheme.

3. The method of claim 2, wherein each of the first RMFE scheme and the second RMFE scheme comprises generating a respective polynomial that lies in the plaintext vector space.

4. The method of claim 2, wherein the first RMFE scheme comprises generating a respective encoded element based on a respective algebraic function field, and the second RMFE scheme comprises generating a respective polynomial.

5. The method of claim 1, wherein:
    performing the inner recode operation based on the second linear map of the plurality of linear maps comprises:
        performing a first transformation on the second linear map to generate the respective refreshed ciphertext, the first transformation comprising an optimized post-multiplication linear map evaluation; and
    performing the encoding operation of the outer recode operation based on the first linear map comprises:
        performing a second transformation on the first linear map to generate the refreshed ciphertext encrypting the plaintext data, the second transformation comprising a linear map evaluation with linearized polynomials.

6. The method of claim 1, wherein the outer recode operation is performed prior to the inner recode operation.

7. The method of claim 1, wherein the inner recode operation is performed prior to the outer recode operation.

8. A system for generating encoded plaintext data in a plaintext vector space, comprising:
    a memory; and
    at least one processor communicatively coupled to the memory and configured to perform operations comprising:
        obtaining a plurality of vectors of plaintext elements, wherein each plaintext element is an element of a first finite field;
        encoding the plurality of vectors of plaintext elements to a vector of field elements, wherein each vector of plaintext elements is encoded to a respective field element of the vector of field elements, each of the field elements is an element of a second finite field, and the second finite field is a finite extension field of the first finite field;
        encoding the vector of field elements into an element of the plaintext vector space to produce the encoded plaintext data;
        encrypting the encoded plaintext data to produce a ciphertext; and
        performing homomorphic computation on the ciphertext, wherein performing homomorphic computation comprises:
            generating a plurality of linear maps based on the encoded plaintext data;
            performing, on the ciphertext, a decoding operation of an outer recode operation based on a first linear map of the plurality of linear maps, the decoding operation generating an outer vector of ciphertexts;
            performing, on each entry of the outer vector of ciphertexts, an inner recode operation based on a second linear map of the plurality of linear maps, the inner recoding operation generating a respective refreshed ciphertext, the respective refreshed ciphertexts forming a refreshed outer vector of ciphertexts; and performing, on the refreshed outer vector of ciphertexts, an encoding operation of the outer recode operation based on the first linear map, the encoding operation generating a refreshed ciphertext encrypting the plaintext data.

9. The system of claim 8, wherein encoding the plurality of vectors of plaintext elements to the vector of field elements is based on a first reverse multiplication friendly embedding (RMFE) scheme, and encoding the vector of field elements into the element of the plaintext vector space is based on a second RMFE scheme.

10. The system of claim 9, wherein each of the first RMFE scheme and the second RMFE scheme comprises generating a respective polynomial that lies in the plaintext vector space.

11. The system of claim 9, wherein the first RMFE scheme comprises generating a respective encoded element based on a respective algebraic function field, and the second RMFE scheme comprises generating a respective polynomial.

12. The system of claim 8, wherein:
performing the inner recode operation based on the second linear map of the plurality of linear maps comprises:
performing a first transformation on the second linear map to generate the respective refreshed ciphertext, the first transformation comprising an optimized post-multiplication linear map evaluation; and
performing the encoding operation of the outer recode operation based on the first linear map comprises:
performing a second transformation on the first linear map to generate the refreshed ciphertext encrypting the plaintext data, the second transformation comprising a linear map evaluation with linearized polynomials.

13. The system of claim 8, wherein the outer recode operation is performed prior to the inner recode operation.

14. The system of claim 8, wherein the inner recode operation is performed prior to the outer recode operation.

15. A non-transitory computer-readable medium for generating encoded plaintext data in a plaintext vector space, the non-transitory computer-readable medium comprising instructions that are operable, when executed by data processing apparatus, to perform operations comprising:
obtaining a plurality of vectors of plaintext elements, wherein each plaintext element is an element of a first finite field;
encoding the plurality of vectors of plaintext elements to a vector of field elements, wherein each vector of plaintext elements is encoded to a respective field element of the vector of field elements, each of the field elements is an element of a second finite field, and the second finite field is a finite extension field of the first finite field;
encoding the vector of field elements into an element of the plaintext vector space to produce the encoded plaintext data;

encrypting the encoded plaintext data to produce a ciphertext; and performing homomorphic computation on the ciphertext, wherein performing homomorphic computation comprises:
generating a plurality of linear maps based on the encoded plaintext data;
performing, on the ciphertext, a decoding operation of an outer recode operation based on a first linear map of the plurality of linear maps, the decoding operation generating an outer vector of ciphertexts;
performing, on each entry of the outer vector of ciphertexts, an inner recode operation based on a second linear map of the plurality of linear maps, the inner recoding operation generating a respective refreshed ciphertext, the respective refreshed ciphertexts forming a refreshed outer vector of ciphertexts; and
performing, on the refreshed outer vector of ciphertexts, an encoding operation of the outer recode operation based on the first linear map, the encoding operation generating a refreshed ciphertext encrypting the plaintext data.

16. The non-transitory computer-readable medium of claim 15, wherein encoding the plurality of vectors of plaintext elements to the vector of field elements is based on a first reverse multiplication friendly embedding (RMFE) scheme, and encoding the vector of field elements into the element of the plaintext vector space is based on a second RMFe scheme.

17. The non-transitory computer-readable medium of claim 16, wherein the first RMFE scheme and the second RMFE scheme comprises generating a respective polynomial that lies in the plaintext vector space.

18. The non-transitory computer-readable medium of claim 16, wherein the first RMFE scheme comprises generating a respective encoded element based on a respective algebraic function field, and the second RMFE scheme comprises generating a respective polynomial.

19. The non-transitory computer-readable medium of claim 15, wherein:
performing the inner recode operation based on the second linear map of the plurality of linear maps comprises:
performing a first transformation on the second linear map to generate the respective refreshed ciphertext, the first transformation comprising an optimized post-multiplication linear map evaluation; and
performing the encoding operation of the outer recode operation based on the first linear map comprises:
performing a second transformation on the first linear map to generate the refreshed ciphertext encrypting the plaintext data, the second transformation comprising a linear map evaluation with linearized polynomials.

20. The non-transitory computer-readable medium of claim 15, wherein the outer recode operation is performed prior to the inner recode operation.

* * * * *